(12) United States Patent
Lyon et al.

(10) Patent No.: US 6,333,917 B1
(45) Date of Patent: Dec. 25, 2001

(54) METHOD AND APPARATUS FOR RED (RANDOM EARLY DETECTION) AND ENHANCEMENTS.

(75) Inventors: Norman A. Lyon, Hull; Todd D. Morris, Stittsville, both of (CA)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/136,416

(22) Filed: Aug. 19, 1998

(51) Int. Cl.$^7$ ........................................ H04J 3/14
(52) U.S. Cl. .................. 370/236; 370/249; 370/252; 370/412
(58) Field of Search ..................... 370/229, 230, 370/231, 232, 233, 234, 235, 236, 237, 412, 249, 252

(56) References Cited

U.S. PATENT DOCUMENTS

| | | | |
|---|---|---|---|
| 4,769,810 | * 9/1988 | Eckberg, Jr. et al. ............... | 370/236 |
| 5,426,640 | * 6/1995 | Hluchyj et al. ...................... | 370/235 |
| 5,650,993 | 7/1997 | Lakshman et al. .................. | 370/236 |
| 5,689,500 | * 11/1997 | Chiussi et al. ....................... | 370/235 |
| 5,864,539 | * 1/1999 | Yin ....................................... | 370/236 |
| 6,069,872 | * 5/2000 | Bonomi et al. ...................... | 370/236 |
| 6,141,323 | * 10/2000 | Rusu et al. ........................... | 370/236 |
| 6,144,636 | * 11/2000 | Aimoto et al. ....................... | 370/229 |
| 6,157,613 | * 12/2000 | Watanabe et al. ................... | 370/229 |

OTHER PUBLICATIONS

Fred Baker, "Fred Baker Explains Cisco's Use of Packet Labeling Algorithms—Weighted Red Permits Specially Labeled Packets to be Shielded from Network Congestion," Brochure (undated).

Mark Gaynor, "Proactive Packet Dropping Methods for TCP Gateways," draft available at www.eecs.harvard.edu/gaynor, pp. 1–26 (Nov. 1996).

Sally Floyd and Van Jacobson, "Random Early Detection Gateways for Congestion Avoidance," IEEE/ACM Transactions on Networking, pp. 1–32 (Aug. 1993).

Sally Floyd and Van Jacobson, On Traffic Phase Effects in Packet–Switched Gateways (undated).

T.V. Lakshman, Arnold Neidhardt, and Teunis J. Ott, "The Drop from Front Strategy in TCP and in TCP over ATM," IEEE, pp. 1242–1250 (1996).

* cited by examiner

*Primary Examiner*—Ricky Ngo
*Assistant Examiner*—Phuc Tran
(74) *Attorney, Agent, or Firm*—Finnegan, Henderson, Farabow, Garrett & Dunner, L.L.P.

(57) ABSTRACT

A random early detection (RED) methodology controls and avoids congestion in a packet network by anticipating congestion and periodically signaling congestion by marking or discarding packets. Sources respond to marked packets by slowing their transmission rates. Enhancements to the basic RED methodology improve performance and reduce buffer requirements in network switches. RED decisions are made as packets leave queues in switches, and RED marks can be accelerated from one packet to another. System response is linearized, and the RED process specifies a marking rate or period rather than a marking probability. A control algorithm permits a single queue operating point. Specific measures are provided for selecting which connection should be marked, and per-connection weight parameters allows customized treatment of connections.

80 Claims, 14 Drawing Sheets

METHOD AND APPARATUS FOR RED (RANDOM EARLY DETECTION) AND ENHANCEMENTS.

BACKGROUND OF THE INVENTION

The present invention relates to congestion control and avoidance in a communications network and, more particularly, to avoiding and controlling congestion in a packet network, such as an asynchronous transfer mode (ATM) network, using a random early detection (RED) strategy. Although the context of this discussion is that of ATM networks, it should be appreciated that the invention has a much broader potential application, and may, for example, be used in all packet networks, including IP. The prior art teaches several ways of avoiding and controlling congestion in a communications network. Two such strategies, known as partial packet discard (PPD) and early packet discard (EPD), help improve throughput during congestion, but the improvement is only partial and can be oscillatory in nature.

In many cases, transport-layer protocols such as TCP still suffer enough loss to temporarily shut down. In the scenarios where packets from many connections are discarded, the sources will all react to congestion and slow down in a synchronous manner. As a result, depending on the size of the buffer and network parameters, a sufficient amount of time may pass such that the buffer completely drains, thereby causing underutilization of the link until the sources increase their transmission rates again. ATM Available Bit Rate (ABR) service, a third approach to congestion avoidance, is effective but requires special source and destination hardware.

Random early detection is yet another strategy for congestion avoidance and control. In short, it provides congestion avoidance by controlling the average queue size. Advantageously, RED causes packet loss in a more distributed fashion than alternative strategies, and does not require specialized hardware—it finctions with existing TCP protocols and hardware. Rather than waiting until the buffer is full or essentially full, RED tries to anticipate the congestion and, as the queue grows, begins signaling congestion by marking or discarding packets, but only periodically. In response to each packet marked or discarded, one source at most will react and slow down, resulting in a reduction in total quantity of traffic transmitted to the switch. If the amount of reduction is insufficient, RED will react by increasing the rate or frequency of packets discarded. If the reduction was sufficient to ease the congestion, RED will reduce the frequency of discard.

S. Floyd and V. Jacobson describe the basic RED algorithm in their paper titled "*Random Early Detection Gateways for Congestion Avoidance*," IEEE/ACM Transactions on Networking, vol. 1, no. 4, pp. 397–413, August 1993. FIG. 1 shows such a RED system indicated generally by reference numeral 10. The RED system controls average queue size by utilizing filter 12 to compute an average queue occupancy based on the instantaneous queue occupancy. When a packet arrives, the filter updates the average occupancy, which the algorithm uses to determine whether to mark the incoming packet. Marking can be accomplished explicitly (e.g., indicating congestion by tagging ATM cells using the Explicit Forward Congestion Indication (EFCI) field) or implicitly (e.g., discarding packets, to which a source protocol such as TCP reacts by slowing down its transmission rate). The algorithm compares the average queue size to a minimum threshold, $min_{th}$, and maximum threshold, $max_{th}$ (14). If the average queue size exceeds the maximum threshold, all arriving packets are marked. Packets are not marked so long as the average queue size remains below the minimum threshold. When the average queue size is between the thresholds, each arriving packet is marked with a per-packet marking probability $P_a$, which weights the random decision of whether or not to mark the packet. To compute the final per-packet marking probability $p_a$, the algorithm first determines an intermediate packet marking probability $p_b$ by comparing average queue size to the minimum threshold and maximum threshold (14). As the average queue size varies from $min_{th}$ to $max_{th}$, the intermediate packet marking probability $p_b$ varies linearly from 0 to the maximum probability, $max_p$. The algorithm then computes the final packet marking probability $p_a$ (16) as a function of the intermediate probability $p_b$ and a count of the number of packets received since the last marked packet. The final packet marking probability increases slowly as the count increases since the last marked packet.

RED's intermittent discards can be preferable to bursty discards caused by EPD or Cell Loss Priority (CLP) thresholds because the latter, which typically affects more than one source at nearly the same time, can result in synchronization of sources. This situation creates an unnecessarily large reduction in the offered load and, therefore, the queue fill. For reasonably sized queues, this can result in queue depletion, which in turn leads to underutilization of the link and less bandwidth for the sources. Further, multiple packet losses from a single source may cause the source to timeout, which causes a significant transient disruption to the fairness of the bandwidth received by each source, and may also cause the source to unnecessarily retransmit some packets.

While known implementations of RED possess certain advantages over other known strategies, it nevertheless suffers from several disadvantages. First, it uses a simple linear finction for translating the amount of control into a discard probability, despite studies that show the relation between source bandwidth and RED discard rate to be decidedly non-linear. Next, current implementations of RED rely on a discard probability that entails a random decision to discard. Basic RED also fails to employ per-connection information, and, as a result, discards may be inconsistent and lack uniformity. Additionally, RED may be prone to biases in the system response caused by connections having different attributes. Still further, basic RED specifies only a queue operating range and not a single queue operating point. Lastly, RED is currently applied only on enqueue, i.e., as packets arrive at the gateway. In certain situations, this can lead to an increase in the time it takes to instruct a source to slow down.

It is, therefore, desirable to provide an enhanced random early detection scheme which addresses each of the aforementioned deficiencies present in current RED implementations. Each of the enhancements associated with the present invention translates into improved performance and reduced buffer requirements. It is even more desirable to provide an improved random early detection strategy for congestion control and avoidance in a network by applying the RED process on dequeue of packets from the gateway and accelerating RED decisions across the queue or link. Further, it is desirable to improve the RED process by linearizing the system response and removing variation in the system response caused by randomness, and to provide a custom finction for linearizing the system. Still further, it is desirable to improve the RED process by specifying a discard rate rather than a discard probability, and to provide specific measures for selecting which connection packets are to be discarded. It is also desirable to introduce a per-connection weight parameter to allow customization of the treatment given each connection and to introduce a control algorithm into the RED process which permits the specification of a single queue operating point.

SUMMARY OF THE INVENTION

A method, consistent with the present invention, is for use in controlling congestion in a network, the network including a switch having a queue for receiving packets transmitted over the network from a plurality of source connections. The method comprises the steps of determining whether to mark a packet as an indication of congestion based on fill of the queue, and marking the packet as the packet leaves the queue.

Another method, consistent with the present invention, is for use in controlling congestion in a network, the network including a switch having a switch fabric and a switch line card. The switch fabric has a queue for receiving packets transmitted over the network from a plurality of source connections, and the switch line card has a queue for receiving packets from the switch fabric. The method comprises the steps of marking a first packet as an indication of congestion as the packet leaves the switch fabric queue, and receiving the first packet at the switch line card queue. The method also comprises the step of marking a second packet in the switch line card queue in response to receiving the first packet.

Yet another method consistent with the present invention is for use in controlling congestion across a link in a network, the network including a switch having a queue for receiving packets transmitted over the network from a plurality of source connections. The method comprises the steps of marking a packet as an indication of congestion, removing the mark from the packet, and transmitting the mark across the link.

Another method consistent with the present invention is for use in controlling congestion in a network, the network including a switch having a queue for receiving packets transmitted over the network from a plurality of source connections. The method comprises the steps of determining a packet marking period defining how often the packets should be marked to indicate congestion, and determining in response to the packet marking period which of the packets should be marked.

Yet another method consistent with the present invention is for use in controlling congestion in a network, the network including a switch having a queue for receiving packets transmitted over the network from a plurality of source connections. The method comprises the steps of determining a single desired queue fill, determining a measure of the queue fill buffer occupancy based on a current queue fill and the single desired queue fill, and determining a packet marking period based on the measure of the queue fill buffer occupancy.

An apparatus consistent with the present invention is for use in controlling congestion in a network, the network including a switch having a switch fabric and a switch line card. The switch fabric has a queue for receiving packets transmitted over the network from a plurality of source connections, and the switch line card has a queue for receiving packets from the switch fabric. The apparatus comprises means for marking a first packet as an indication of congestion as the packet leaves the switch fabric queue, means for receiving the first packet at the switch line card queue, and means for marking a second packet in the switch line card queue in response to receiving the first packet.

Another apparatus consistent with the present invention is for use in controlling congestion across a link in a network, the network including a switch having a queue for receiving packets transmitted over the network from a plurality of source connections. The apparatus comprises means for marking a packet as an indication of congestion, means for removing the mark from the packet, and means for transmitting the mark across the link.

Yet another apparatus consistent with the present invention is for use in controlling congestion in a network, the network including a switch having a queue for receiving packets transmitted over the network from a plurality of source connections. The apparatus comprises means for determining a packet marking period defining how often the packets should be marked to indicate congestion, and means for determining in response to the packet marking period which of the packets should be marked.

Another apparatus consistent with the present invention is for use in controlling congestion in a network, the network including a switch having a queue for receiving packets transmitted over the network from a plurality of source connections. The apparatus comprises means for determining a single desired queue fill, means for determining a measure of the queue fill buffer occupancy based on a current queue fill and the single desired queue fill, and means for determining a packet marking period based on the measure of the queue fill buffer occupancy.

Yet another apparatus consistent with the present invention is for use in controlling congestion in a network, the network including a switch having a queue for receiving cells transmitted over the network from a plurality of source connections. The apparatus comprises means for determining a packet marking period based on a function that linearizes the response of the source connections to a packet being marked, and means for marking at least one packet according to the packet marking period.

A communications network consistent with the present invention comprises a plurality of sources transmitting packets to a plurality of destinations, and a plurality of packet switches, each packet switch comprising a queue for receiving the packets transmitted over the network from the sources, and means for controlling congestion in the network including means for determining whether to mark a packet as an indication of congestion based on fill of the queue and means for marking the packet as the packet leaves the queue.

Another communications network consistent with the present invention comprises a plurality of sources transmitting packets to a plurality of destinations and a plurality of packet switches, each packet switch comprising a queue for receiving the packets transmitted over the network from the sources and means for controlling congestion in the network including means for determining a packet marking period defining how often the packets should be marked to indicate congestion, means for determining in response to the packet marking period which of the packets should be marked, and means for generating a request for marking a packet that will arrive at the queue in the future according to the packet marking period.

Yet another communications network consistent with the present invention comprises a plurality of sources transmitting packets to a plurality of destinations and a plurality of packet switches, each packet switch comprising a queue for receiving the packets transmitted over the network from the sources and means for controlling congestion in the network including means for determining a single desired queue fill, means for determining a measure of the queue fill buffer occupancy based on a current queue fill and the single desired queue fill, and means for determining a packet marking period based on the measure of the queue fill buffer occupancy.

The advantages accruing to the present invention are numerous. Each of the enhancements consistent with the present invention translates into improved system performance and/or reduced buffer demands. Random early detection consistent with the present invention also results in improved fairness for switch users.

The above object and other objects, features, and advantages of the present invention will be readily appreciated by one of ordinary skill in the art from the following detailed description of the best mode for carrying out the invention when taken in connection with the accompanying drawings.

DETAILED DESCRIPTION OF THE PREFERRED EMBODIMENT

Figure 2:
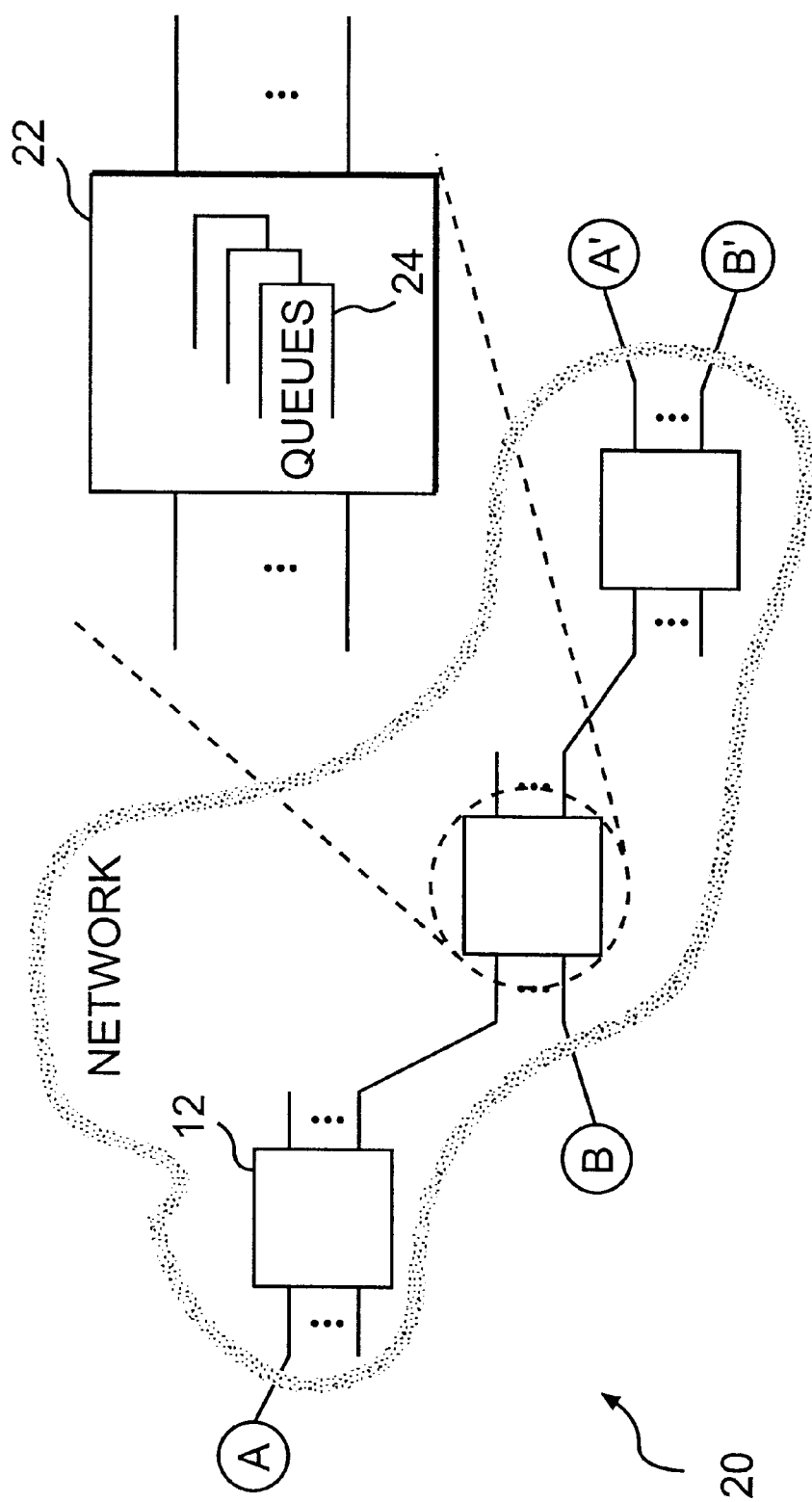
FIG. 2 is a high level block diagram of a network in which the enhanced random early detection scheme consistent with the present invention may be implemented.

FIG. 2 shows a high level block diagram of a network 20 within which the congestion control scheme consistent with the present invention may function. That scheme is applicable to and may be implemented with any switch or router that carries information, such as data, through a congestable resource, and where the information is generated by end systems that are capable of slowing down the transmission of information to the network in response to an indication of congestion. The congestion indication may be explicitly signaled (e.g., marked using congestion indication such as the ATM EFCI field) or implicitly signaled (e.g., discarding data if the source protocol responds to data loss by slowing down, such as TCP does, the transmission rate). A typical example of such a switch or router is ATM switch 22 in which the information is transmitted in packets or frames which have been split into ATM cells for transmission over network 20. Switch 22 may also be a packet switch.

As shown in FIG. 2, end systems or nodes A, B, A', and B' connect to the network and serve as the source and sink of network traffic. Although unidirectional connections are shown and are implied by the orientation of queues 24 in switch 22, the connections shown, A to A' and B to B', are typically bidirectional, and the systems consistent with the present invention may operate in both directions. The mapping of traffic to queues 24 is arbitrary. That is, queue 24 may correspond to a single connection, a group of connections, or all connections. Switch 22 need not be of any particular architecture and, for example, may be input-buffered, output-buffered, or a hybrid.

Figure 3:
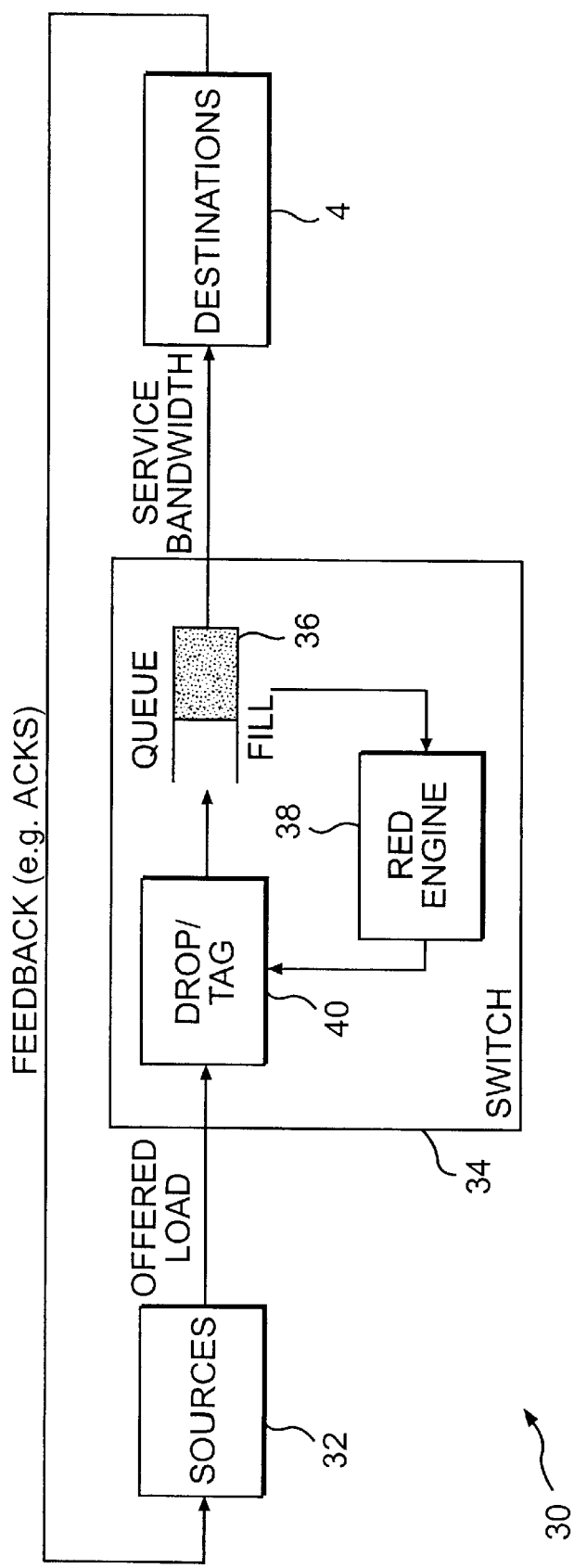
FIG. 3 is a block diagram illustrating a conventional RED system.

Referring now to FIG. 3, a block diagram illustrates how a conventional RED system, shown generally by reference numeral 30, controls congestion. In system 30, a number of sources 32 are transmitting packets, shown as the offered load, over a link to switch 34 which includes queue 36. RED engine 38 monitors the queue fill, as was described earlier in connection with FIG. 1, and, as the queue fill grows, drop/tag section 40 marks packets that have yet to enter the queue by discarding or tagging them. With an appropriate protocol (e.g., TCP) or hardware to detect tagged packets, the dropping/tagging is recognized as a feedback signal directing sources 32 to slow down. Thus, with a properly sized queue and RED parameters, it is possible to control the sources' offered load and make it match the service bandwidth provided to destinations 42 before queue 36 overflows.

Figure 4:
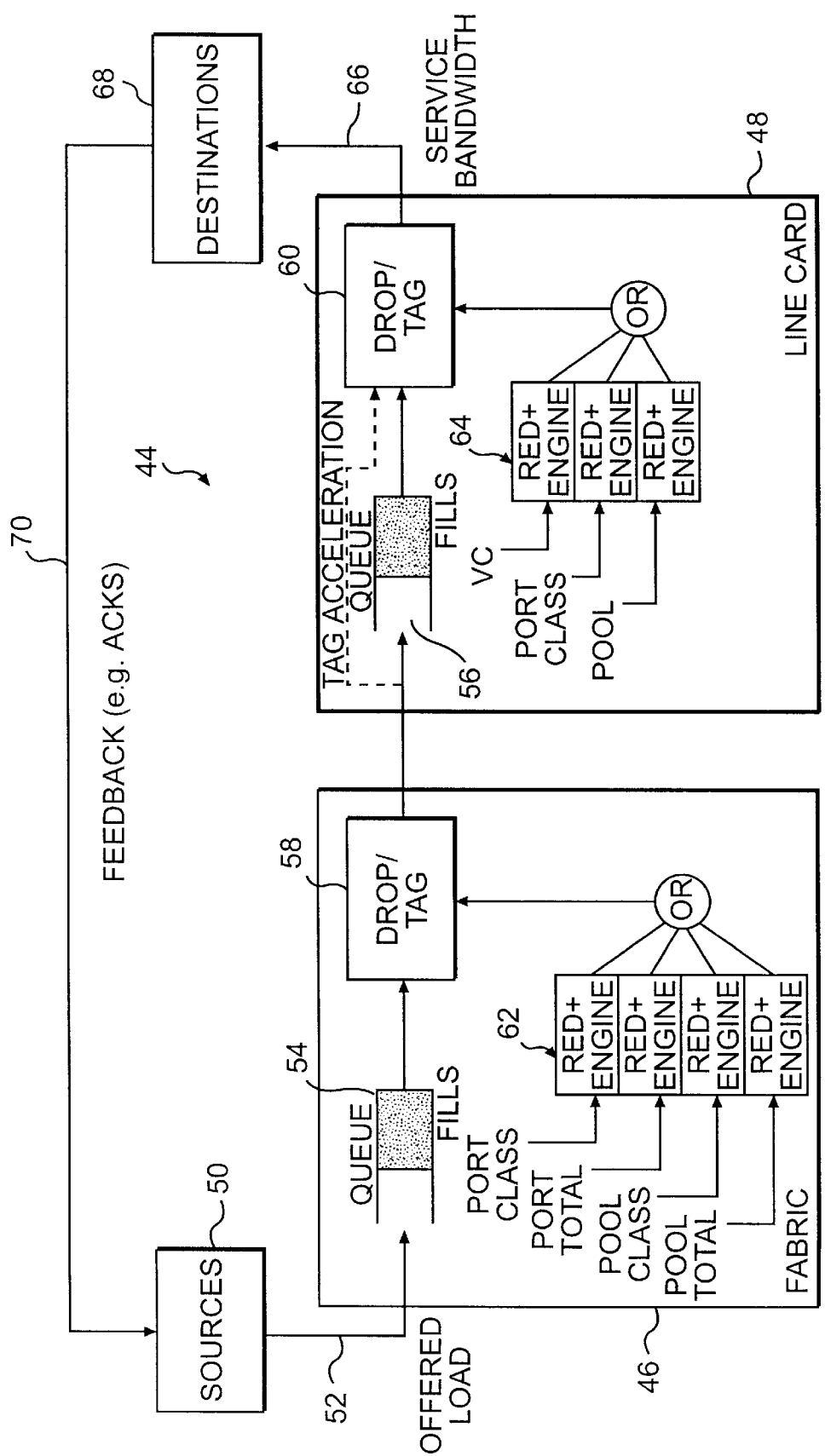
FIG. 4 is a block diagram of a RED+ system consistent with the present invention.

FIG. 4 depicts, in block diagram form, a RED+ system consistent with the present invention. The system, shown generally by reference numeral 44, operates within a switch and includes switch fabric 46 in communication with switch line card 48. At least one source 50 transmits packets as an "offered load" to switch fabric 46 over link 52. As shown, switch fabric 46 and line card 48 include buffer or queue 54 and 56, drop/tag section 58 and 60, and at least one RED+ engine 62 and 64, respectively. As explained in greater detail below, the RED+ engines monitor the fill of buffers 54 and 56. The packets are forwarded at a "service bandwidth" from line card 48 over link 66 to at least one destination 68, which is in communication with sources 50 through feedback path 70.

As shown in FIG. 4, a RED+ system consistent with the present invention exists in both fabric 46 and line card 48 so as to provide complete protection in controlling congestion. Preferably, there are multiple RED+ engines within switch fabric 46 and line card 48, together covering the various dimensions of buffer management (e.g., pool class and port class in the fabric, virtual circuit (VC) in the line card to name a few). There are also two separate exhaustible buffer resources, not specifically illustrated for the sake of clarity, in the fabric, pool buffers, and port buffer pointers.

In a RED+ system consistent with the present invention, congestion control is improved by reducing the delay in notifying the source to slow down its transmission rate. By reducing the time necessary for feedback of information to the source, the RED+ system can achieve tighter control over queue fills in the switch. As will be described below, there are several ways in which a RED+ system consistent with the present invention can reduce delay in the feedback loop, including implementing RED on dequeue instead of enqueue, accelerating the RED decision across a queue, or accelerating the RED decision across a link.

In one method of controlling congestion consistent with the present invention, the switch implements the drop/tag finction on dequeue, (i.e., after the queue), rather than on enqueue (i.e., before the queue) as in current implementations of RED. As illustrated in FIG. 4, drop/tag function 58 occurs as packets leave queue 54 in switch fabric 46, and drop/tag function 60 occurs as packets leave queue 56 in line card 48.

One benefit of discard/tag on dequeue is reduced delay in notifying source 50 to slow down transmission by effective removal of the queuing delay caused by switch fabric 46 and/or line card 48 from the feedback loop. The queuing delay can be very large, especially as buffer sizes continue to increase. In certain scenarios, the queuing delay can exceed network delay and may dominate the round-trip time of the connections. Therefore, by removing the queuing delay, the RED+ system achieves tighter control over the queue fill because source 50 will respond more quickly to discarded or tagged packets.

There are also implementation advantages to RED+ on dequeue. For example, in an output-buffered switch with multiple enqueues that must be handled during a single dequeue time, a conventional RED system with the drop/tag function on enqueue requires a substantial amount of peak processing bandwidth. A RED+ system consistent with the present invention requires much lower processing bandwidth because the drop/tag function applies only to a single dequeue instead of multiple enqueues. Thus, positioning the drop/tag function on dequeue instead of enqueue leads to a simpler implementation.

A RED+ ATM system consistent with the present invention achieves discard on dequeue by sending an idle cell in place of the dropped cell. While sending an idle cell requires bandwidth, this wastage is usually insignificant considering the low frequency at which RED+ will actually drop cells. A small amount of discarding can achieve a large reduction in offered load. Thus, a small amount of bandwidth may be knowingly wasted to achieve greater congestion control.

RED+ also contemplates a tag acceleration feature that further reduces the delay in notifying a source to slow down by pushing marks ahead of packets associated with them. With continuing reference to FIG. 4, a tag acceleration feature consistent with the present invention operates across line card 48. If a RED+ system implemented in fabric 46 tags packets instead of discarding them, line card 48 can identify the tag at enqueue (when the packet arrives at queue 56) and feed-forward the notification, tagging a packet at or near the head of queue 56 in line card 48. This further reduces the delay in notifying the source to slow down by removing most or all of the line card 48 queuing delay from the fabric's RED+ signaling path.

Conceptually, the tag field is considered a parallel, yet independent, stream from the packet itself, such that the fabric's tag can be removed from one packet and applied to another packet. If the RED+ engine marks by performing explicit connection selection, as will be described below, then the tag acceleration feature of RED+ moves the tag to the earliest packet in the queue that belongs to the selected connection. This is generally easier to implement when a single queue corresponds to one connection rather than multiple connections. If the RED+ engine does not perform explicit connection selection, then the tag acceleration feature of RED+ can move the tag to the packet at the head of the queue.

When the RED+ engine performs explicit connection selection, as will be described in more detail below, it creates different classes of connections. In this scenario, line card 48 performs tag acceleration by maintaining a count per class of the number of tags awaiting bypass, not particularly shown. When a packet tagged by RED+ engines 62 in fabric 46 arrives at the line card enqueue, line card 48 clears the tag and increments the awaiting bypass count of the connection's class. Whenever line card 48 dequeues a packet belonging to the same connection class, if the count is non-zero, line card 48 either tags or discards the packet and decrements the count. This process conserves the total number of tags generated.

A RED+ system consistent with the present invention further contemplates acceleration across a link. This requires some form of signaling channel to convey RED marks across the link, whether the channel is implicit and embedded within each connection's packets, or whether it is explicit, and can function without connection traffic. With an embedded, implicit signaling channel, the connection identifier is implied. With an explicit signaling channel, the connection identifier may have to be explicitly signaled. If the packet format has a proprietary header, then a RED mark field may be added to it; otherwise RED marks will have to be indicated using some existing field, e.g., the EFCI feature in ATM.

While acceleration across the link may not provide significant performance gain by itself, when implemented along with acceleration across a queue, it provides a means to further accelerate a tag across the next queue after the link. This acceleration may continue, hop by hop, all the way to the destination, which could even turn the indication around back to the source if a second signaling channel was available for the reverse indication.

Extending the acceleration across a point where new connections merge may not always be desirable. Once the mark has left the original point of congestion, it would only be useful to transfer it to packets in the same connection or in other connections that also went through the same congestion point. If the signaling channel carries information identifying all connections at a congestion point, then marks can be transferred to other connections. Otherwise, the mark will be confined to a connection. If a mark is inappropriately transferred to a connection that did not go through the congestion point, then the source that ultimately slows down may offer no relief to the congestion point.

It may not always be desirable to accelerate a mark or tag. For example, if a marked packet cannot be admitted to a queue, it may not be possible to accelerate the mark across the queue because there are no other packets queued for the same connection as the marked packet. An attempt to accelerate the mark may cause the RED+ system to lose the mark. A better solution in such a case would be to discard the marked packet instead. Discarding the packet is a form of implicit marking, which can be recognized by a source using a protocol such as TCP as an implicit signal to slow down the transmission rate. Thus, by discarding the marked packet, the RED+ system does not lose the mark.

Figure 5:
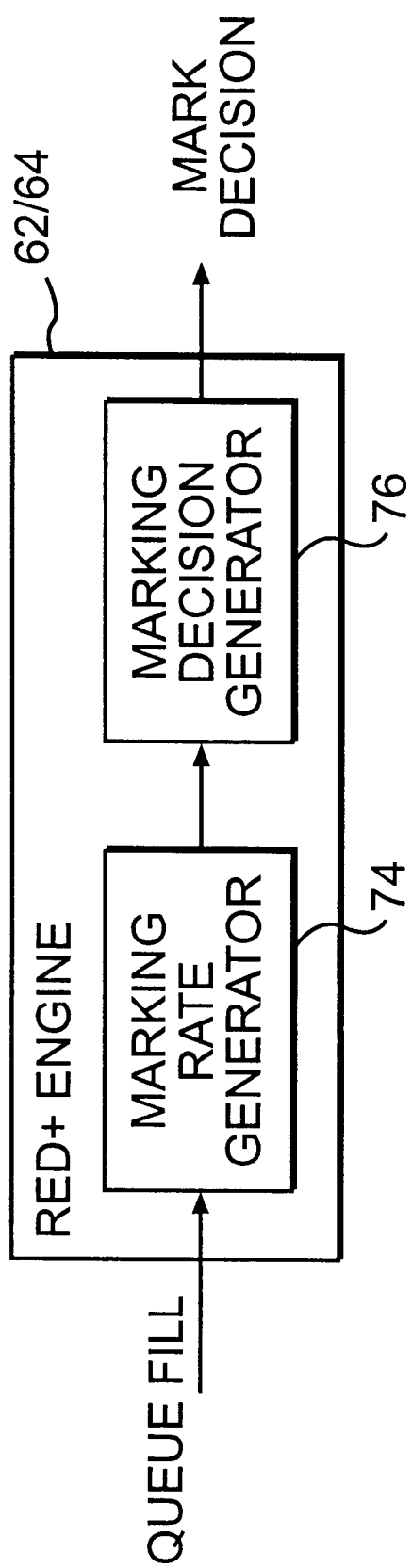
FIG. 5 illustrates a RED+ engine consistent with the present invention.

FIG. 5 illustrates one of the RED+ engines 62/64 shown in FIG. 4. Each RED+ engine includes marking (i.e., drop/tag) rate generator 74 and marking (i.e., drop/tag) decision generator 76. Marking rate generator 74 functions to observe the queue dynamics and determine the frequency of dropping/tagging packets. The marking rate generator may, for example, operate on queue fill (or some other congestion measure) and determine the rate at which packets should be marked. This marking rate is fed to marking decision generator 76, whose function is to generate instantaneous, packet-by-packet decisions to mark that conform to the given rate input. The packet to be marked may be the current packet, one already queued, or one yet to arrive.

This separation of marking rate and marking decision functions is based on real-time criticality. Marking decision generator 76 operates in real time, providing a decision for each dequeue opportunity, whereas marking rate generator 74 runs as fast as possible so as not to contribute significantly to sampling delay or aliasing. This may be achieved with a sampling period as long as 1,000 packet times or longer, depending on the network scenario. Because running with a faster sampling rate places increased demands on the data path width within the marking rate generator, it is desirable to make the sampling rate provisionable to insure against having insufficient range in the data path width and in RED+ parameters.

Figure 6:
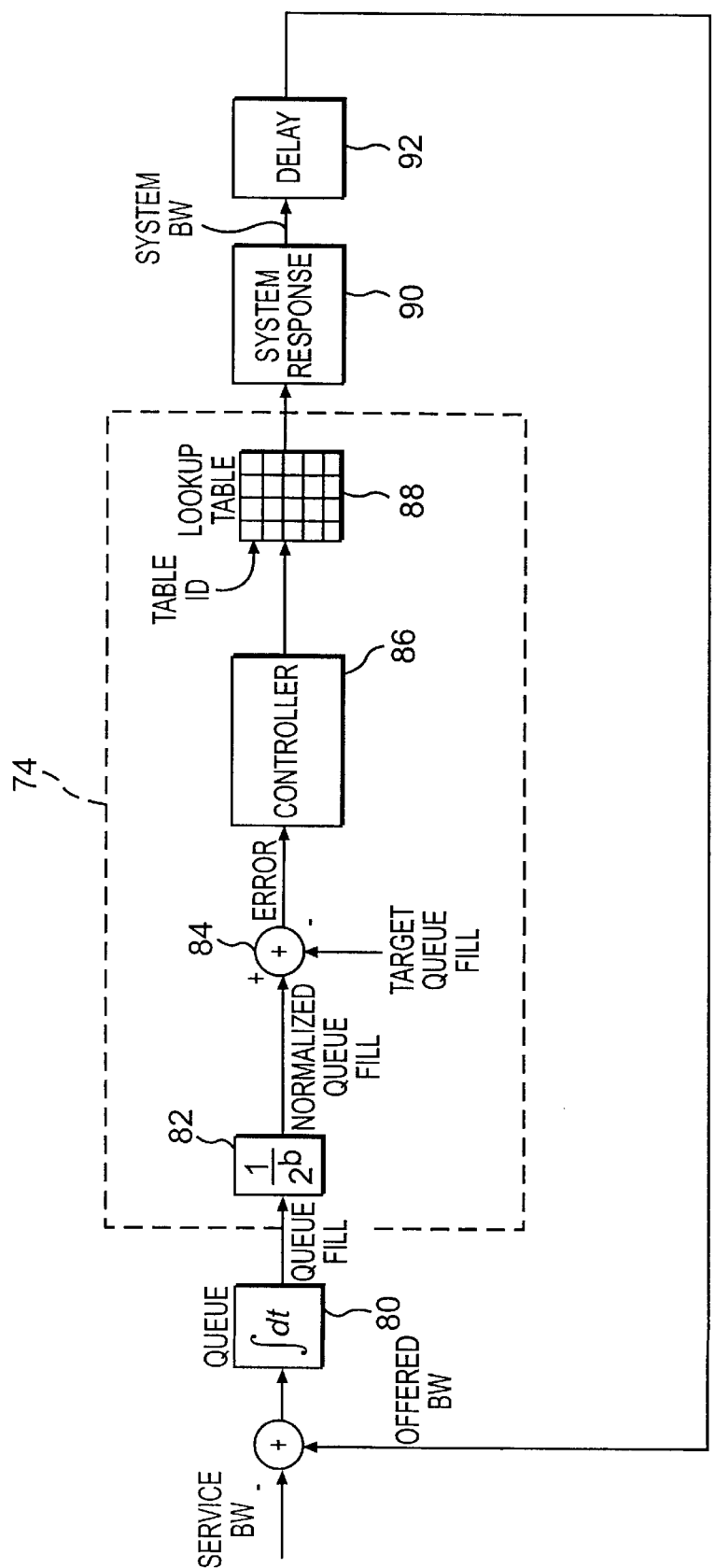
FIG. 6 is a block diagram of a closed-loop system consistent with the present invention.

FIG. 6 depicts marking rate generator 74 in greater detail in the context of the entire closed loop system consistent with the present invention. In short, marking rate generator 74 transforms a queue fill into a marking rate. The integral (block 80) over time of the excess load is the queue fill. Excess load exists when the enqueue rate (offered bandwidth) exceeds the dequeue rate (service bandwidth). The queue fill is first normalized or scaled to the size of the queue. In one implementation, the normalization/scaling is by $\frac{1}{2}^b$ (block 82), where b is chosen such that the value of $2^b$ is equal to or larger than the maximum queue size. Both of the outputs of blocks 80 and 82 may be thought of as instantaneous occupancies. Desired or target queue fill (the fraction of the total buffer space at which the fill should be maintained) is subtracted from the normalized queue fill (summer 84). That difference—instantaneous error or queue fill buffer occupancy—is input to a controller (block 86), which will be described in more detail below. The output of the controller is then input to a look-up table (block 88), which will also be described in more detail below, to determine the packet marking rate. As previously noted (see FIG. 5), the packet marking rate is provided to a packet marking decision generator. The system response (block 90) includes the sources and the nature of their reaction to the discarding/tagging of packets, which results in a new system bandwidth. Delay (block 92) represents various delays, including the delay from the point of exercising RED+ back to the source as well as the delay from source with new bandwidth to the switch again, amounting to the round trip time. The delayed system bandwidth results, and is fed back as shown as offered bandwidth.

A disadvantage of a conventional RED system is that it does not have a single operating point because it determines the marking probability as a function of queue fill, using the queue fill as an integrator. For example, the marking probability function may have been engineered for the queue to operate at a certain level. If network conditions (e.g., the number of sources, round-trip time of connections, or packet length) change, however, the nominal queue fill, or operating point, will also change until it reaches a new equilibrium point. Therefore, a conventional RED system requires a range of operating points, which can only be bounded to upper and lower thresholds, the position of the operating point between the thresholds depending on the network scenario at a particular point in time. Since the nominal queue fill operating point can be anywhere between the upper and lower thresholds, a conventional RED system may require large queue buffers to deal with scenarios where the operating point approaches the upper threshold. The buffers must also be large enough to handle additional burstiness beyond the maximum threshold.

Figure 7:
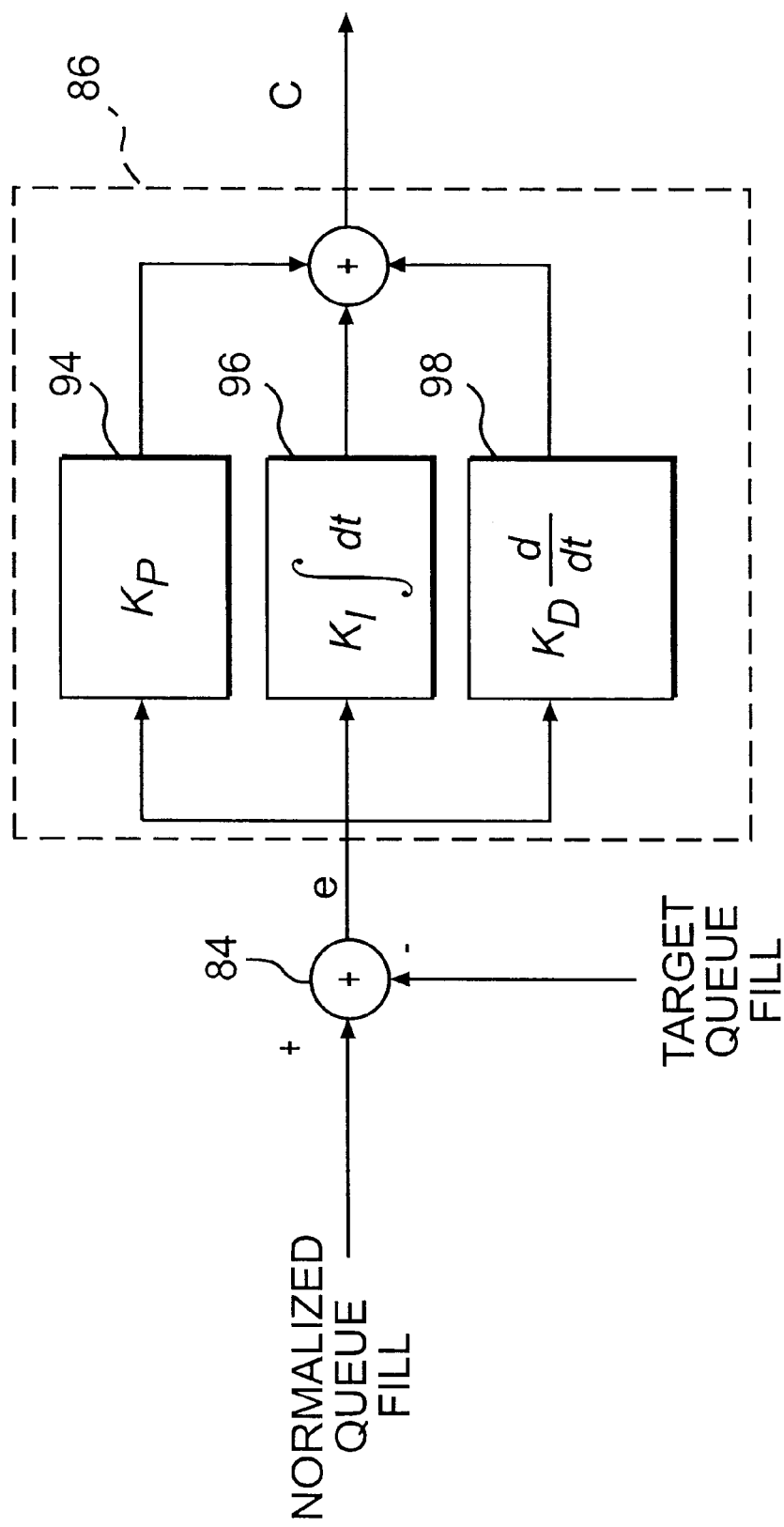
FIG. 7 is a block diagram of a controller mechanism consistent with the present invention.

In contrast, a RED+ system consistent with the present invention improves upon conventional RED by implementing an explicit integrator in controller 86 to maintain a single nominal queue fill over a wide range of network scenarios. Such an improved controller is illustrated in FIG. 7, which is the time domain representation of a PID (Proportional, Integrator, Derivative) controller, belonging to a simple and well-known class of controllers in control theory. The proportional component (block 94) responds to the current situation, the integrator component (block 96) responds to past situations, and the derivative component (block 96) responds to an extrapolated future situation.

As was also illustrated in FIG. 6, FIG. 7 shows the calculation of an error by summer 84 between a reference level, i.e., the target queue fill, and the quantity to be controlled, i.e., the normalized queue fill. The error is passed to the three parallel components of controller 86. The proportional component (block 94) scales the error by the proportional coefficient $K_P$. The integrator component (block 96) integrates the error over time and scales the current integral by the integral coefficient $K_I$. The derivative component (block 98) differentiates the error with respect to time and scales the derivative by the derivative coefficient $K_D$. The results of all three components are summed to produce a control variable, C, which is then used by the rest of the system to effect some change in the queue fill. All three coefficients—$K_P$, $K_I$, and $K_D$—can be set to optimize the system's transient response. Alternatively, the response can be intentionally overdamped to provide a degree of burst tolerance.

By responding to the queue fill as it has developed over time, the integrator component (block 96) implements the simplest form of "learning." Use of the explicit integrator allows the system to achieve zero DC, or steady-state, error in a closed-loop system. This characteristic can be used to correct the marking parameter in such a way as to bring the nominal queue fill back to a single operating point, rather than an operating range as in conventional RED. With the use of an explicit integrator, deviations in network conditions affect the integrator, and not the queue fill. Therefore, a RED+ system consistent with the present invention requires only a single reference queue level, rather than an upper and lower threshold as in conventional RED. A single operating point achieved by the RED+ system translates into more efficient use of buffer memory in a switch and ultimately tighter control in the system.

For implementational simplicity at high speeds, the coefficients $K_P$, $K_I$, and $K_D$ can be restricted to powers of 2. By emphasizing coverage of a wide range of coefficient values, the system can be tuned to be close to the desired optimal or overdamped response for a wide variety of conditions.

In a RED+ system consistent with the present invention, controller 86 may also contain a derivative component, or differentiator (block 98). A differentiator causes a reaction in the feedback loop based on anticipation of future conditions, given the rate of change of the queue fill. Generic simulations that compare PI to PID control show very significant improvement in transient response. Therefore, although the derivative term is sensitive to noise, so that large round-trip connection times and bursty data traffic may limit the improvement, there is still some benefit to including a differentiator. For example, the derivative term improves response by helping to overcome latency in the system (latency delays seeing a response to a change in control).

With reference again to FIG. 6, a RED+ system consistent with the present invention also implements look-up table 88 to obtain the packet marking, or packet drop/tag, rate. The look-up table replaces the calculations of the intermediate probability $p_b$ and per-packet marking probability $p_a$ associated with basic RED discussed above in reference to FIG. 1. The RED+ approach flows from the realization that there is a non-linear relationship, rather than a linear relationship, between the packet marking probability and the combined rate at which the sources transmit. Many factors contribute to the combined transmission rate, including the number of sources, the round trip time of each connection, packet length, and protocol specifics (e.g., the slow-start, fast retransmit, and SACK features of TCP).

Figure 1:
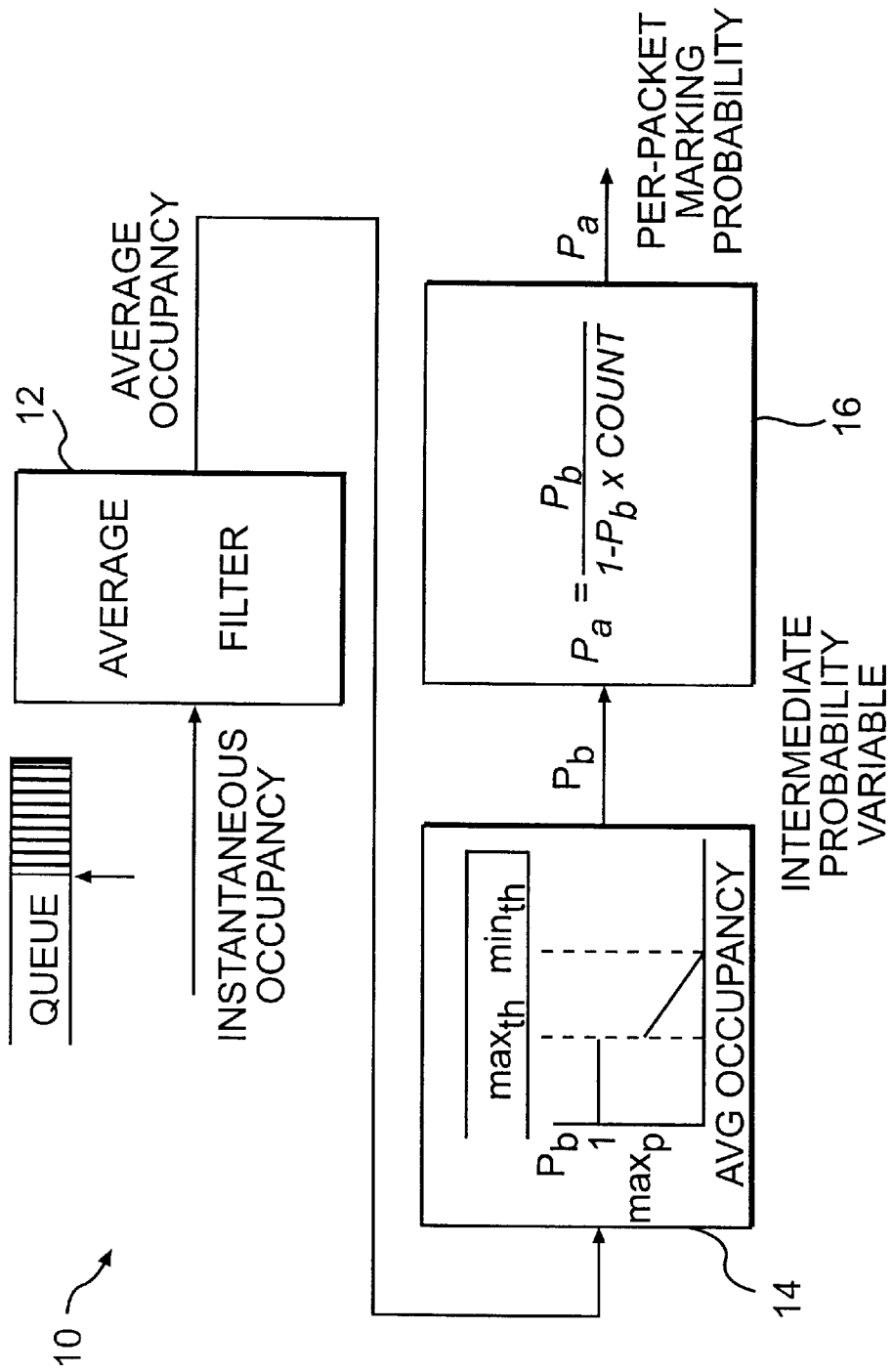
FIG. 1 is a high level block diagram of basic random early detection known in the art.
Figure 8:
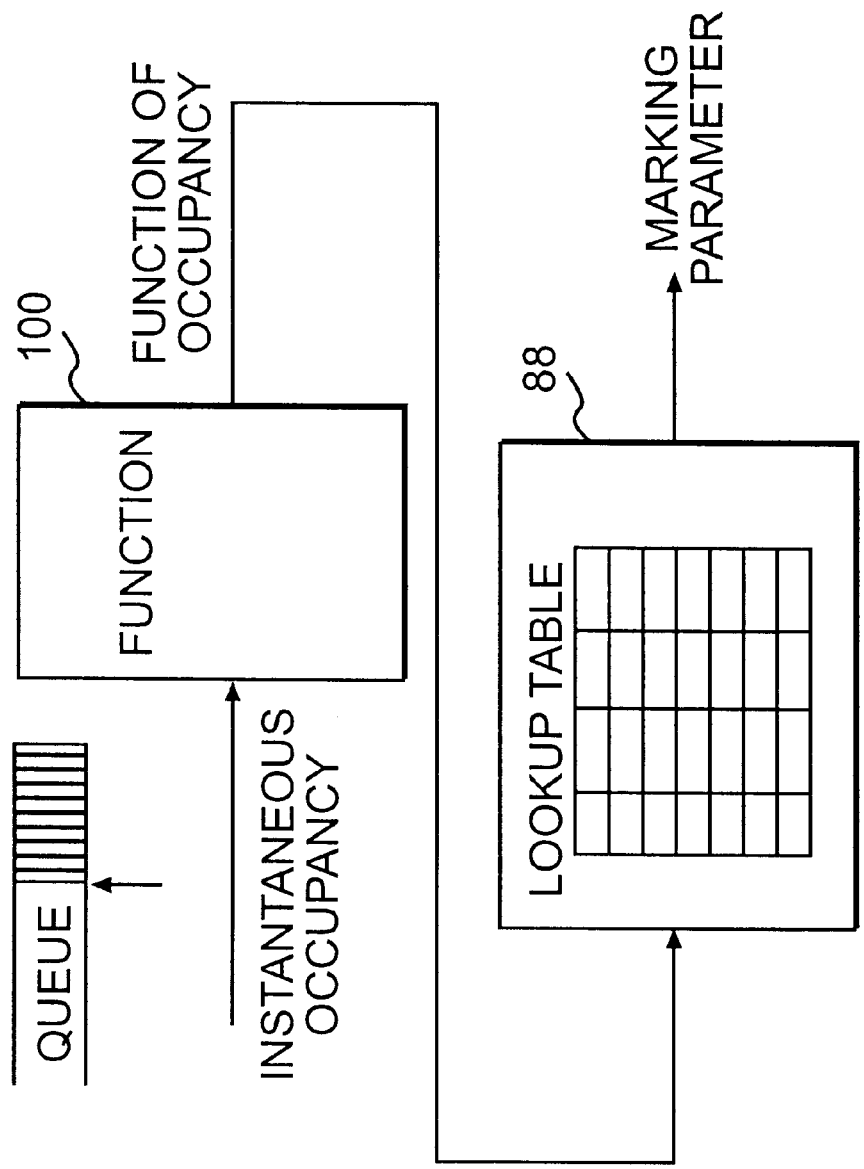
FIG. 8 is a block diagram of a look-up mechanism consistent with the present invention.

A RED+ system consistent with the present invention replaces the packet marking probability calculation of the conventional RED system with customized look-up table 88 that linearizes the system response, i.e., the response of the sources to marked packets. While a conventional RED system calculates a per-packet marking probability based on average occupancy of the queue, one of skill will appreciate that other RED schemes may measure queue occupancy with a different function. To illustrate the applicability of table look-up 88 to other RED schemes, FIG. 8 shows a less specific function 100 replacing average filter 12 (FIG. 1). Further, to illustrate the applicability of look-up table 88 to various implementations that may control marking as a rate or period instead of as a probability, the output of look-up table 88 is referred to more generally as a marking "parameter" in FIG. 8.

A linearized system, such as that achieved with the look-up table consistent with the present invention, can have its other tunable parameters optimized over a range of operating points (queue fills), whereas a non-linear system like basic RED can typically only be optimized for a single operating point. In a non-linear system, other operating points may have a non-optimal response, possibly being conservative and leading to an overdamped or slower than necessary response from the sources. Alternatively, a non-optimal response may be aggressive and lead to sustained oscillations and result in increased buffer usage.

Yet another benefit derived from the use of look-up table 88 is the ability to "soften" the edges of hard transitions in behavior. One such hard transition is shown in FIG. 1 in regard to the operation of basic RED, wherein the value of the intermediate probability variable $p_b$ is discontinuous, jumping from a value of $max_p$ to a value of 1 when the average occupancy reaches the maximum threshold. Such discontinuities invite oscillation if, for example, the ideal operating point lies between available values, whereas the look-up table approach consistent with RED+ allows for a more gradual transition. While that particular non-linearity may still result in oscillation with RED+, the greater transition region possible with a look-up table will help reduce the amplitude of any resultant oscillation. Reducing the number of and effect of oscillations leads to improved congestion control performance.

Referring again to FIG. 5, each RED+ engine includes marking (i.e., drop/tag) rate generator 74 and marking (i.e., drop/tag) decision generator 76. As described above, rate generator 74 finctions to observe the queue dynamics and determine the frequency of dropping/tagging packets. The rate generator outputs a marking rate, or more generally a marking parameter, as indicated in FIG. 8. The RED+ engine feeds this parameter to marking decision generator 76, whose function is to generate instantaneous decisions to mark that conform to the given rate input. The packet to be marked may be the current packet, one already queued, or one yet to arrive.

Figure 9:
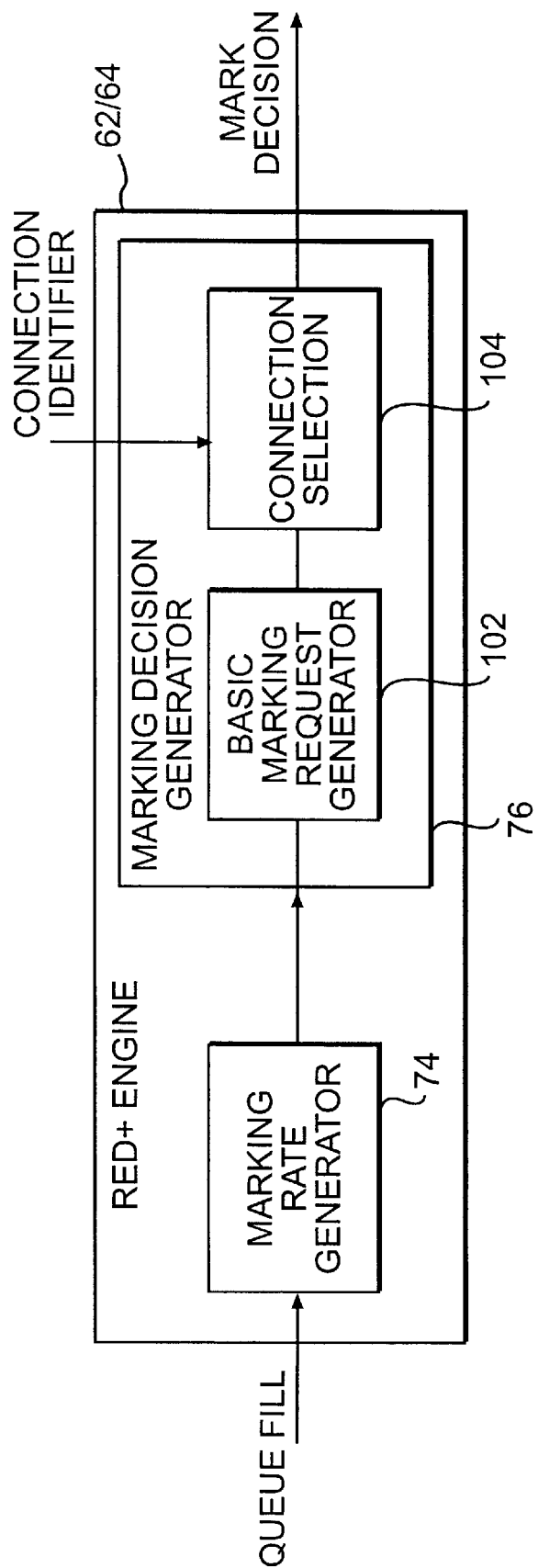
FIG. 9 is a block diagram illustrating in more detail the RED+ engine of FIG. 5.

A further benefit obtained from RED+ consistent with the present invention is more deterministic marking of packets than possible with known implementations of RED. Optimal performance is obtained when two semi-independent aspects—when to mark and which connection to mark—are made as deterministic as possible. FIG. 9 illustrates these two aspects of marking decision generator 76. Basic marking request generator 102 determines when to mark and issues a marking request, which passes to connection selection function 104. As will be described below, connection selection function 104 manages the outstanding requests and considers each connection as a candidate for marking.

Basic RED, as described by Floyd and Jacobson (FIG. 1), employs a purely random approach for determining when to mark. The intermediate probability variable $p_b$ is massaged into a per-packet marking probability $p_a$ to place an upper bound on the marking period (X), which is one plus the number of successive unmarked packets. The lower bound on X remains 1, however, allowing for a significant variability in successive values of X (between marked packets).

The effect of this variability in the marking period is increased variability in the queue fill or buffer occupancy distribution, which is undesirable. Removing the variability in marking period tightens control over the queue fill. Accordingly, RED+ makes the marking period a deterministic function of the queue fill. When the average queue fill is a particular value, instead of allowing from 0 to $1/(p_b-1)$ packets to pass before marking another packet, exactly X packets are allowed to pass before marking another (where X is repeatable and lacks random variation). By deterministically marking every $X^{th}$ packet, spacing is uniform and the distribution on the buffer occupancy is tighter. Less of a buffer is required, and buffer space freed up may be shared or used by other classes of traffic.

It has been suggested that making X fully deterministic will yield a phenomenon known as "packet phase effects." Where the sources are sending packets in a periodic, deterministic fashion, and a switch is deterministically dropping every $X^{th}$ packet, it is thought by some that only packets from a subset of sources will be dropped, resulting in a bias against that subset of sources. The possibility of this effect can be allayed, however, by adding a small amount of controlled randomness to the generation of X. In light of all the sources of randomness in real networks, it is plausible that no amount of controlled randomness need be introduced and that so-called packet phase effects arise only in simulations. Nevertheless, the ability to add some randomness is desirable as insurance, and the ability to control the amount of randomness, down to and including zero randomness, is desirable for optimization.

Figure 10:
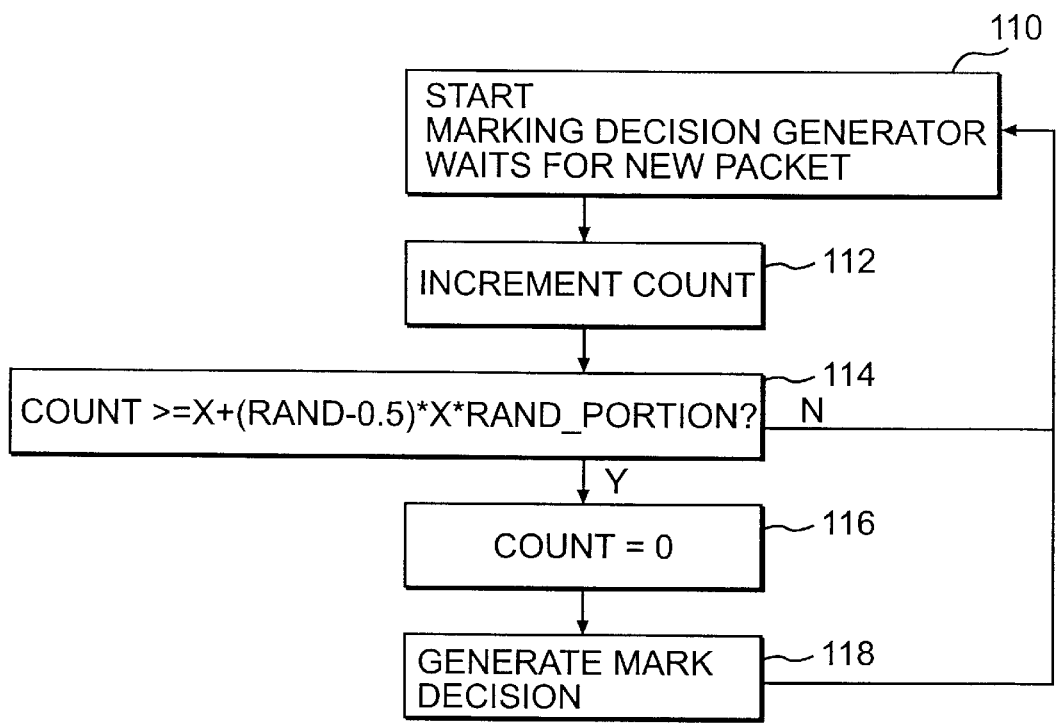
FIG. 10 illustrates a flowchart for marking decision generation consistent with the present invention.

FIG. 10 presents a flowchart illustrating the operation of a marking decision generator consistent with the present invention. Each RED+ engine has a state variable, COUNT, which counts the number of packets passed since the last mark, and a parameter, RAND_PORTION, which controls the amount of randomness added to the decision. The marking rate generator, operating on queue fill or some congestion measure, determines the rate at which the RED+ engine should mark packets. This marking rate may be expressed in the form of a period, X, the number of packets the RED+ engine should let pass before marking a packet. The use of a marking period instead of a marking rate simplifies implementation of the marking decision generator. It simply needs to count the number of packets passed since the last mark to determine when to mark another packet.

With continuing reference to FIG. 10, the decision generator operates as follows. First, it waits for a new packet to arrive (step 110). When a packet arrives, the decision generator increments COUNT (step 112). It compares COUNT to X plus some randomness, controlled by the parameter RAND_PORTION and RAND, a random number between 0 and 1, recomputed with each pass (step 114). If COUNT is greater than or equal to X plus randomness, then the decision generator resets COUNT to 0 (step 116), generates a mark decision (step 118), and returns to a state of waiting for the next packet. If, in step 114, COUNT is less than X plus randomness, then the decision generator decides not to mark and returns to a wait state.

Regarding the other aspect—which connection to mark—the approach taken by basic RED is to mark whatever connection is offering a packet to the switch when it is time to mark. The deterministic approach consistent with the present invention is based on the ability to select a particular connection from all connections currently having packets in the queue when it is time to mark. Alternatively, it is possible to compromise on when to mark and wait for a suitable connection to offer a packet to the switch. Marking a packet already in the queue is equivalent to going back in time to when that packet arrived, while waiting for a suitable connection to offer a packet is equivalent to going forward in time. Suitability can be determined a number of ways, for example by time or by packet.

Selectivity in choosing which connection should drop a packet is advantageous from a fairness standpoint. RED+ can target connections that utilize excessive bandwidth. Leaving to chance the selection of which connection to drop from may result in selection of a low-bandwidth connection, which can in turn lead to chance impact on the total load offered by the sources. Dropping a packet from a low-bandwidth connection may result in only a small reduction in that connection's transmission rate compared to the larger reduction in offered load which would likely result from dropping a packet from a high-bandwidth connection.

There are several approaches possible for identifying which connection to mark. In one approach consistent with the present invention, the marking decision generator selects from the connections having packets in the queue. As previously mentioned, this is equivalent to going back in time to when the packet arrived. If there is a small number of packets in the queue, i.e., the queue fill is small, the number of connections from which the marking decision generator can choose may be limited. The marking decision generator issues a marking command to mark the selected packet.

In another approach consistent with the present invention, the marking decision generator delays marking until a packet arrives on a connection suitable for marking. The decision generator notes when a connection is marked, so that when it considers that connection for selection in the future, it can make a relative determination of how long it has been since it last marked that connection. This approach is less constrained than marking a packet that is already in a queue, an approach that limits the marking possibilities. This second approach endeavors to select connections that have not been marked too recently, and so the decision generator may maintain running statistics (e.g., a running average, updated as each packet passes) on this metric and use the information to select connections based on certain relative criteria (e.g., above average, or top quartile, etc.). This approach effectively issues marking requests, which are equivalent to pending, unexecuted marking commands.

Using this second approach, the decision generator might determine which connection to mark based only on the time elapsed since the connection was last marked. Using only a measure of time, however, may not necessarily be sensitive to differences in connection rates or speeds. A better measure for determining which connection to mark endeavors to equalize bandwidths. For example, if the decision generator notes the time of the last selection of a connection and counts the packets since that time, it can determine the average bandwidth on a connection since its last selection. The decision generator can then use this information to selectively pick high bandwidth connections for marking. Not only does selection based on connection bandwidth improve fairness, but it will also make the system response to a RED mark more consistent, and hence lowers dynamic buffer requirements in the switch. The combination of bandwidth and time as selection criteria is advantageous because, if only bandwidth is considered, a connection with high bandwidth may be selected and marked many times before the system responds to the marking. This is due to the latency in source response to the marks, i.e., bandwidth offered to the RED+ engine may remain high even though the engine has marked multiple packets because there is some lag time before the sources respond to the marks and slow down their transmission rates. If the connection attracts an unfair share of marks in a short interval, this may lead to a temporary collapse of the source's throughput (e.g., in TCP, a time-out may occur because the fast retransmit feature would likely be defeated).

A RED+ engine consistent with the present invention may bound the length of delay in marking that occurs while the decision generator waits for a packet to arrive on a suitable connection. One approach to bounding the delay is to limit the number of outstanding mark requests that may accumulate. If a new mark request would exceed the limit, the decision generator forces the marking of the current packet, regardless of the connection to which it belongs, in order to honor the oldest outstanding mark request. The new request then fits within the allowed budget of outstanding requests. This forced marking of the current packet is generally preferable to losing the request since there will be at least some response from the system. The system response to an arbitrary connection selection in such cases is no worse than the response effected by a basic RED algorithm.

If the RED+ engine allows the number of outstanding mark requests to grow too large while waiting for a packet to arrive on a suitable connection, then the decision of when to mark becomes less deterministic. There is, therefore, a trade-off between allowing too many outstanding mark requests and maintaining a high level of determinism in the decision of when to mark. In many cases, though, it is reasonable to allow only one outstanding marking request, since the relatively low marking rate of RED affords a generous selection of connections between marking requests.

Figure 11:
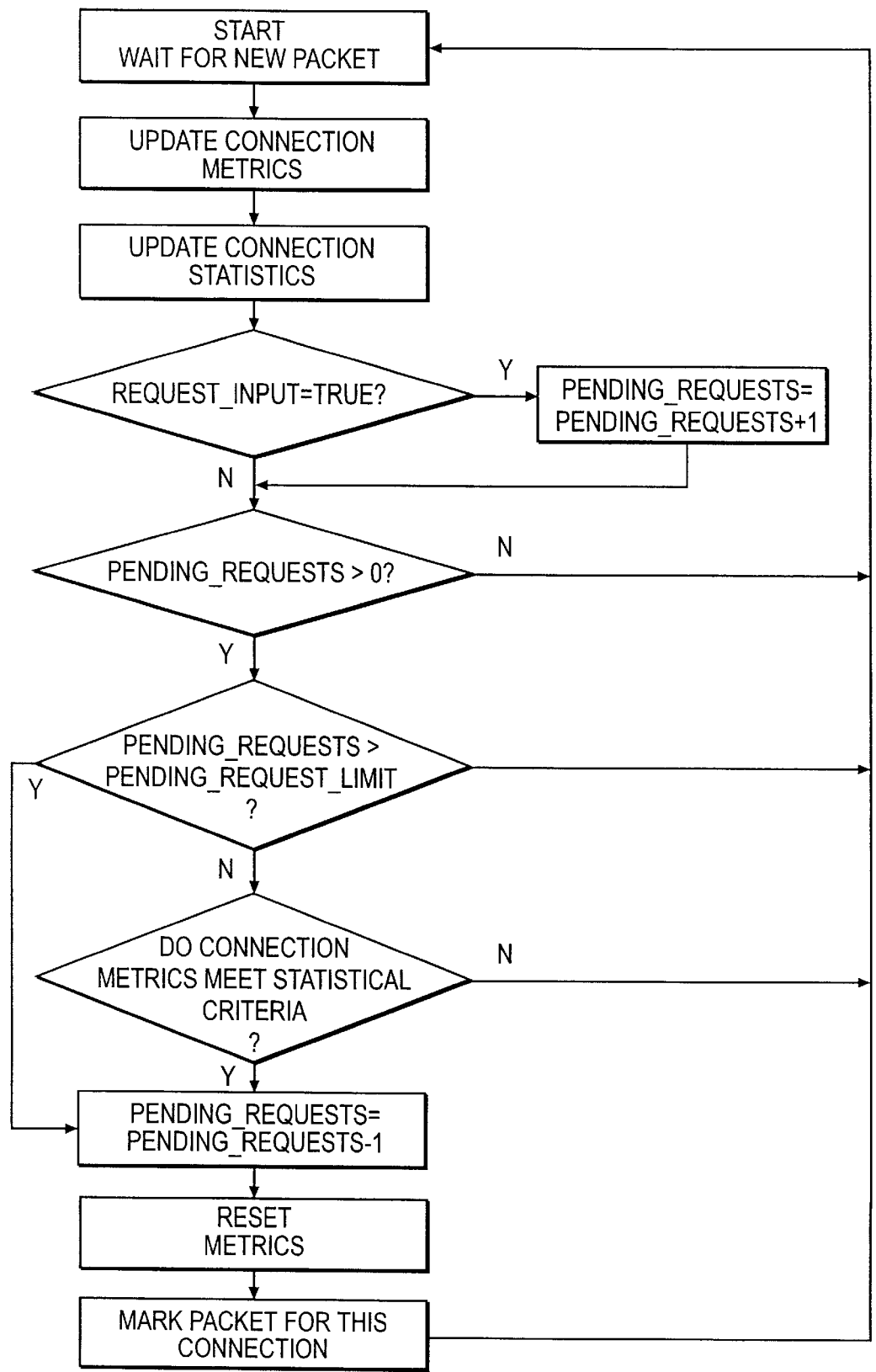
FIG. 11 illustrates a flowchart for connection selection consistent with the present invention.

FIG. 11 presents a flowchart illustrating operation of connection selection consistent with the present invention. The connection selection function within the marking decision generator waits for a new packet to arrive (step 120). When a packet on a particular connection arrives, the connection selector updates connection metrics, e.g., a count of the number of packets for the connection that have arrived since the last time a packet on the connection was marked (step 122). There is at least one metric per connection. The connection selector also updates connection statistics (step 124), which are based on the connection metrics accumulated in step 122. There is at least one connection statistic per RED+ engine. If the connection selector receives a marking request from the marking request generator (step 126), it increments by one the number of pending marking requests (step 128) and proceeds to step 130. If there is no marking request, flow proceeds directly from step 126 to step 130. If there are no pending marking requests (step 130), flow proceeds to step 120, and the connection selector waits for the next packet. If the number of pending marking requests is greater than zero (step 130), then the connection selector determines whether the number exceeds the limit (step 132). If the number exceeds the limit, then flow proceeds directly to step 136. If the number does not exceed the limit, then the connection selector determines whether the connection metrics meet the statistical criteria for marking (step 134). If they do not, flow proceeds to step 120, and the connection selector waits for the next packet. If the statistical criteria are met in step 134, or if the number of pending requests exceeds the limit in step 132, then the connection selector decrements the number of pending requests by one (step 136) and resets the connection metrics (step 138). Finally, the connection selector marks the packet on the selected connection (step 140).

In one approach to determining which connection to mark consistent with the present invention, the RED+ engine looks only at the number of packets that have passed since the last time it marked a particular connection. In this scenario, one metric per connection (e.g., a count of the number of packets for this connection since the last time this connection was marked) and one connection statistic per RED+ engine (e.g., a dynamic estimate of the peak metric amongst the active connections) will suffice. The connection statistic can be implemented, for example, as an exponentially weighted moving-average (EWMA) filter with peak follower.

Figure 12:
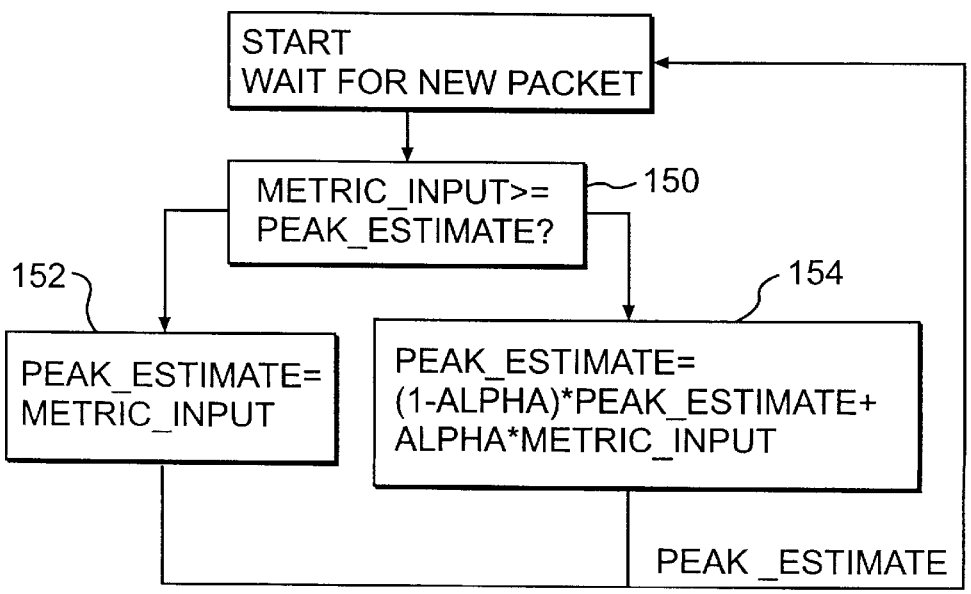
FIG. 12 illustrates a flowchart for operation of an EWMA peak follower consistent with the present invention.

An EWMA filter estimates a process with a smoothed average of recent inputs, the more recent inputs being weighted more heavily than earlier inputs. An EWMA peak follower is like a simple EWMA except that it immediately follows any input that exceeds its current output. This approach is useful when trying to estimate the peak metric. FIG. 12 illustrates the operation of such an EWMA peak follower in the context of the present invention. The process of updating the connection statistic (step 124 in FIG. 11) involves updating the output of the EWMA peak follower in FIG. 12. The inputs to the EWMA peak follower are the connection metric for the current connection (from step 122 in FIG. 11), represented as METRIC_INPUT in FIG. 12, and the previous value of the EWMA peak follower output, represented as PEAK_ESTIMATE in FIG. 12. The EWMA peak follower compares METRIC_INPUT to PEAK_ESTIMATE (step 150). For example, if the connection metric is the number of packets since the last time the connection was marked, the EWMA peak follower compares this number to its own output. If the connection metric is greater than or equal to the output, the new PEAK_ESTIMATE is the value of the connection metric (step 152). If the connection metric is less than the output, the output is decayed toward the value of the connection metric, e.g., the number of packets since the last time the connection was marked (step 154). The ALPHA parameter in step 154 controls the rate of decay, which is exponential in this example. Decay of the output is necessary because the EWMA peak follower may never see an input that matches or exceeds its current output. Alternatively, the output could decay to zero instead of the value of the connection metric. The decay could also be linear instead of exponential.

Figure 13:
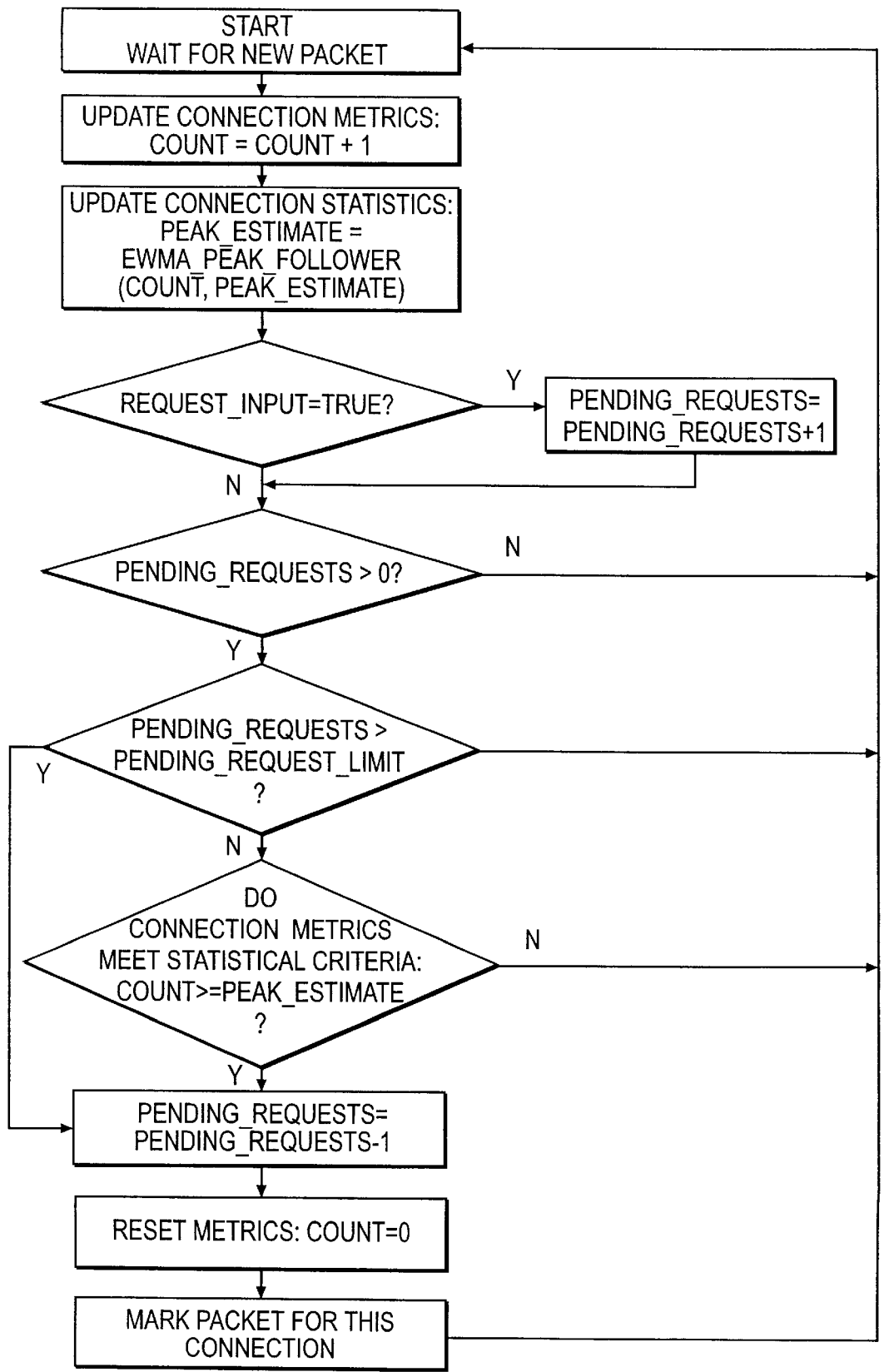
FIG. 13 illustrates a detailed flowchart for connection selection consistent with the present invention.

FIG. 13 shows the application of the EWMA peak follower connection statistic to the scenario in which the connection metric is the number of packets passed since the last mark on a particular connection. The connection selector updates the connection metric by incrementing by one the count of packets since the last mark (step 162). The connection selector then updates the connection statistics by calculating the output of the EWMA peak follower, where the connection metric input is the count of packets since the last mark (step 164). In determining whether the connection metric meets the statistical criteria (step 174), the connection selector compares the count of packets to the updated connection statistic, i.e., the latest output of the EWMA peak follower. If the count is greater than or equal to the updated peak estimate, then the criteria are met, and the packet will be marked in step 180. The connection selector resets the connection metrics by resetting the count of packets since the last mark to zero (step 178). The remaining steps (160, 166–72, 176, 180) are equivalent to steps in FIG. 11 (120, 126–32, 136, 140, respectively).

In another approach to determining which connection to mark consistent with the present invention, the RED+ engine monitors bandwidth as well as the number of packets since the last mark. In this scenario, two metrics per connection are used: a count of packets since the last mark for that connection (COUNT), as in the previous approach, and the time of the last packet marked for the connection (LAST_MARK). The RED+ engine also uses two connection statistics, e.g., the peak bandwidth among connections (PEAK_BW) and the average time between marks (AVG_TIME). For each connection being considered, the time since the last mark is computed as

TIME_SINCE_LAST_MARK=CURRENT_TIME−LAST_MARK, and the connection's latest bandwidth (BW) is computed as

BW=COUNT/TIME_SINCE_LAST_MARK.

The criteria for selecting a connection are the conjunction of meeting or exceeding the average time between marks and meeting or exceeding the peak bandwidth. Time between marks is checked to allow a connection time to react to a mark before marking it again. The average time between marks is a looser criterion than peak bandwidth and could alternatively be some fraction of the average so long as it does not approach the reaction time of the sources.

Figure 14:
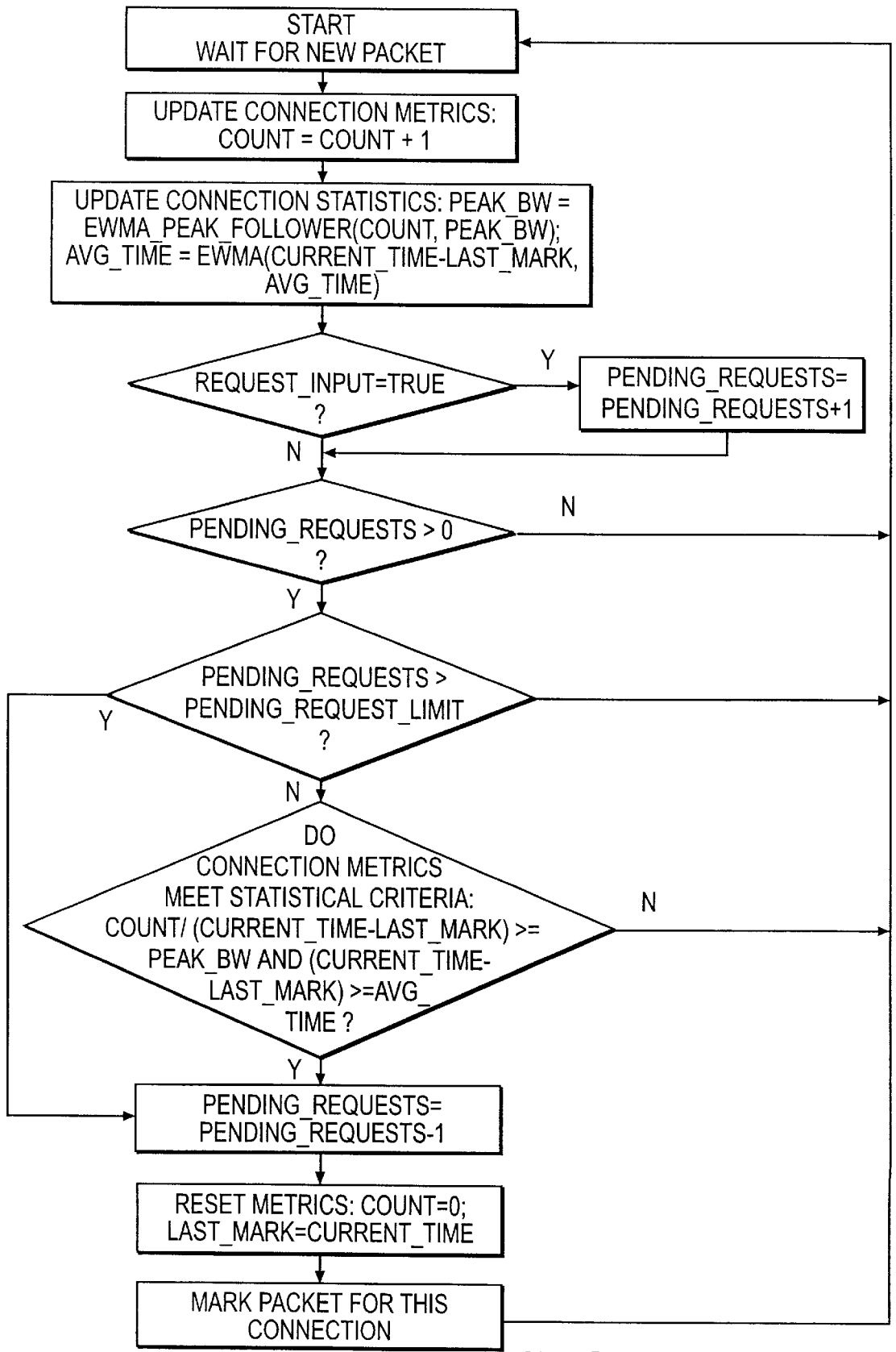
FIG. 14 illustrates another detailed flowchart for connection selection consistent with the present invention.

FIG. 14 illustrates the flow of connection selection under this approach, i.e., where number of packets since the last mark and the time of the last marked packet are the connection metrics. The connection selector updates connection metrics by incrementing the count of packets since the last mark (step 202). Two connection statistics are updated (step 204). First, PEAK_BW is implemented as an EWMA peak follower with the number of packets since the last mark (COUNT) as input. Second, AVG_TIME is implemented as a simple EWMA with the time since the last mark as input. The connection metrics meet the statistical criteria, and the packet is marked, if the current bandwidth (the number of packets since the last mark divided by the time since the last mark) is greater than or equal to the updated peak bandwidth (PEAK_BW) and if the time since the last mark is greater than or equal to the average time between marks (AVG_TIME) (step 214). The connection selector resets the connection metrics by resetting the packet count to zero and setting the time of the last mark to the current time. The remaining steps (200, 206–212, 216, 220) are equivalent to steps in FIG. 11 (120, 126–32, 136, 140, respectively).

It is advantageous for many queues in a switch to share one RED+ engine in order to reduce context requirements, particularly when a switch has a large number of queues, e.g., a per-VC ATM switch. It is also advantageous in such a scenario to use deterministic marking to generate a marking period. In this scenario, a RED+ engine consistent with the present invention includes a controller shared among a number of queues.

In operation of the shared controller consistent with the present invention, the error term associated with the current queue is applied to the shared controller. Because one error term is likely to be uncorrelated with the next error term, which may be from another connection, the derivative term of the controller is of little use and may be disabled ($K_D=0$). The behavior of the integrator, however, is useful because it will adjust the marking parameter so that the average error, across active connections, is zero. The proportional term is also useful, and its contribution is added to that of the integral. The controller outputs a control signal, C, that consists of a slowly changing average component (contributed by the integral) and a rapidly changing per connection component (contributed by the proportional term). When deterministic marking is implemented, C will either directly or indirectly, i.e., through a look-up table, generate a marking period.

In implementing deterministic marking in conjunction with a shared controller consistent with the present invention, the RED+ engine maintains a shared count of the number of packets since the last mark, i.e., the count is not connection-specific. The RED+ engine compares this shared count to the marking period to determine not only when to mark but also which connection to mark.

Figure 15:
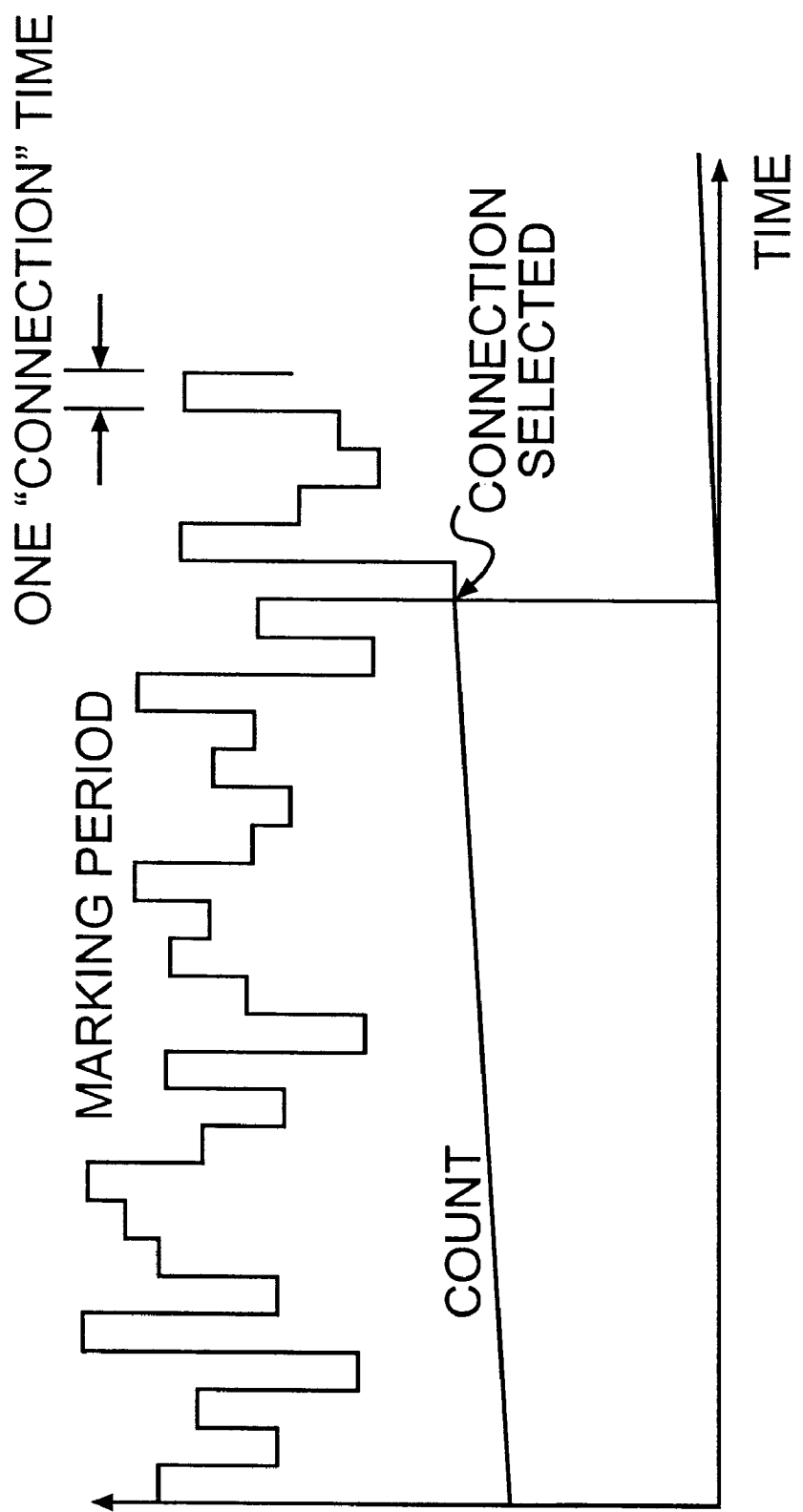
FIG. 15 illustrates the operation of a shared controller with deterministic marking consistent with the present invention.

FIG. 15 illustrates the operation over time of a shared controller consistent with the present invention. The marking period jumps somewhat erratically about an average value. Its "skyline" appearance emphasizes its discrete nature; it has one value per "connection" time. As illustrated in FIG. 15, as long as the count rises slowly relative to the connection time (which it will for large marking periods), the RED+ engine considers a reasonably large number of connections for marking before the count changes significantly. This leads to a reasonable selection of a connection with a marking period close to the minimum active marking period.

One potential drawback of the shared controller may be that if the connection's source has not responded and the connection's queue fill has not dropped by the time the count regains its former value, then that same connection may be selected, unless there are connection metrics to prevent its re-selection. Whether this situation occurs depends very much on the particular network scenario.

RED+ also supports the use of a per connection weight that allows customization of each connection's treatment. For service providers having clients in different premium or tariff classes (i.e., one is paying more for better service), RED+ offers the ability to defer selection of a connection based on a weight. For example, if a premium customer's connection has a higher weight, that connection can be exempt from selection, or selection of that connection can at least be deferred by dropping packets from lower class customers. A per connection weight can also be used to equalize biases in fairness caused by factors such as variations in round-trip time among connections.

Weighted RED has been implemented in connection with the basic RED system of FIG. 1. One approach, for example, described in the February 1997 issue of the Cook Report, allows the definition of separate RED thresholds and drop probabilities for each of a small number of classes, each connection being a member of a single class. A RED+ system consistent with the present invention can also use a per-class weight by having a separate RED+ engine for each class, each with independent parameters.

RED+ also contemplates the use of weighting mechanisms at the connection level instead of at the class level. This finer granularity of weighting allows for differentiation of connections that are within a single class and therefore share a RED+ engine. There are two approaches to per-connection weighted RED consistent with the present invention: a scheme for modifying the metrics and statistics used in the connection selection procedure, and a method for "pardoning" a packet about to receive a mark.

The first approach to weighted RED+ assigns to each connection one or more parameters that are used to modify the comparison of statistics and metrics in the connection selection procedure. For example, in the case where bandwidth is measured and the connection metrics are the number of packets since the last mark and the time since the last mark, as described earlier in connection with FIG. 14, a weight can be associated with each connection and used to normalize the connection's bandwidth for the EWMA peak follower update and for connection selection.

For example, if the weights range from 0 to 1, this approach normalizes a connection's bandwidth by dividing the bandwidth by the connection's weight. A connection with a weight of 0.5 will have a normalized bandwidth that is twice its actual bandwidth. Since the EWMA bandwidth peak follower now operates on normalized bandwidths, this connection will be eligible for selection when its actual bandwidth exceeds 50% of the normalized peak estimate. If the parameter used is instead the inverse of the weight, then multiplication instead of division normalizes the bandwidth.

It is important that the EWMA peak follower as well as the connection selection process operate on normalized bandwidths. Otherwise, if the peak follower operates on actual bandwidths and then the peak estimate is scaled, the normalized peak is not followed, introducing greater variability in the system response which the introduction of the peak follower seeks to avoid. Operating the peak follower on normalized bandwidths targets only peak usage connections, but all usage is normalized and not absolute.

In this approach to weighted RED+, the bandwidth received by a connection will be approximately proportional to its weight. This approach of normalization can easily be adapted to other metrics and statistics besides bandwidth.

Another approach, which is independent of the previous metric/statistic scheme, assigns probabilistic weights to connections that can be used to generate a "pardon" from a marking decision. This approach can be added to RED+ engines consistent with the present invention with or without an explicit connection selection mechanism. If there is no explicit connection selection, this approach in effect creates a connection selection mechanism. With this approach, each connection is assigned a weight. Just before a mark decision is made, the RED+ engine generates a random number within the range of weights and compares it to the connection's weight. Depending on the outcome, the RED+ engine either executes the decision normally or "pardons" the connection by deferring the mark request until it finds another suitable connection.

This scheme advantageously is less complex to implement than the first approach because it does not require per-connection metrics. There may be, however, less of a direct relationship between the weight of a connection and its possibility of being marked because, due to its random nature, the scheme will not defer a mark indefinitely and may mark any connection regardless of its weight.

It will be appreciated by one of ordinary skill in the art that the term "packet" can refer to either an ATM cell or an AAL5 packet in an ATM environment. Accordingly, a RED+ system consistent with the present invention can operate on either ATM cells or AAL5 packets. Depending on the network scenario, one method may be advantageous over the other. For example, if RED+ operates on a cell basis, the system is more sensitive to true connection bandwidth because the cells are of equal size, and the true bandwidth of a connection is directly proportional to its cell rate. On the other hand, if RED+ operates on a packet basis, the system is inherently sensitive to packet rates, which deviate from true bandwidths depending on the packet length, unless certain compensating measures are taken as described by Floyd and Jacobson.

If marking is done by discarding rather than tagging, there may be some benefit to operating RED+ on a packet basis because whole packets are discarded, offering performance gains conceptually similar to EPD. However, cell-based RED+, where packets are accelerated across the queue or RED is done on dequeue, results in superior usage of buffer memory. At instants when buffer memory is a scarce resource, cell-based RED+ can result in a significant gain in throughput. At instants when buffer memory is not scarce, the small loss in throughput caused by operating on cells instead of packets will be insignificant in most cases.

It will be apparent to those skilled in this art that various modifications and variations can be made to the enhanced random early detection strategy of the present invention without departing from the spirit and scope of the invention. Other embodiments of the invention will be apparent to those skilled in this art from consideration of the specification and practice of the invention disclosed herein. It is intended that the specification and examples be considered exemplary only, with a true scope and spirit of the invention being indicated by the following claims.

We claim:

1. A method for use in controlling congestion in a network, the network including a switch having a queue for receiving packets transmitted over the network from a plurality of source connections, the method comprising:
   determining a tagging period defining how often a packet should be tagged to indicate congestion; and
   determining in response to the tagging period which packet should be tagged, further comprising:
      selecting a particular connection from which packets may be tagged,
      updating a count of a number of packets passed on the selected connection since the selected connection was last tagged,
      updating a measure of time since the selected connection was last tagged,
      updating a statistic based on the updated count and the updated measure of time via an exponentially weighted moving-average filter with peak follower,
      determining whether the updated statistic meets predetermined statistical criteria, and
      deterministically generating a decision whether to tag the packet from the selected connection.

2. A method for use in controlling congestion in a network, the network including a switch having a queue for receiving packets transmitted over the network from a plurality of source connections, the method comprising:
   determining a tagging period defining how often a packet should be tagged to indicate congestion; and
   determining in response to the tagging period which packets should be tagged, further comprising:
      selecting a particular connection from which the packet may be tagged,
      generating a random number falling within a range of weights,
      comparing the generated random number to a weight of the selected connection,
      determining whether to tag the selected connection based on the comparison, and
      deterministically generating a decision to tag the packet from the selected connection.

3. A method for use in controlling congestion in a network, the network including a switch having a queue for receiving packets transmitted over the network from a plurality of source connections, the method comprising:
   determining a tagging period defining how often a packet should be tagged to indicate congestion; and
   determining in response to the tagging period which packets should be tagged, further comprising:
      selecting a particular connection from which a next packet may be tagged, the connection not currently having packets in the queue,
      deterministically generating a decision to tag the next packet from the selected connection,
      maintaining a count of the number of tagging decisions generated,
      tagging the next packet to arrive on the selected connection according to the tagging decision,
      decrementing the count after any packet is tagged,
      determining when the count exceeds a predetermined limit, and
      tagging the next packet to arrive on any connection after the count is determined to exceed the limit.

4. A method for use in controlling congestion in a network, the network including a switch having a queue for receiving packets transmitted over the network from a plurality of source connections, the method comprising:
   determining a single desired queue fill;
   determining a measure of the queue fill buffer occupancy based on a current queue fill and the single desired queue fill;
   integrating the measure of the queue fill buffer occupancy over time; and
   determining a packet tagging period based on the integrated measure of the queue fill buffer occupancy.

5. A method for use in controlling congestion in a network, the network including a switch having a queue for receiving packets transmitted over the network from a plurality of source connections, the method comprising:
   determining a single desired queue fill;
   determining a measure of the queue fill buffer occupancy based on a current queue fill and the single desired queue fill;
   differentiating the measure of the queue fill buffer occupancy with respect to time; and
   determining a packet tagging period based on the differentiated measure of the queue fill buffer occupancy.

6. A method for use in controlling congestion in a network, the network including a switch having a queue for receiving packets transmitted over the network from a plurality of source connections, the method comprising:
   determining a single desired queue fill;
   determining a measure of the queue fill buffer occupancy based on a current queue fill and the single desired queue fill; and
   determining a packet tagging period based on the measure of the queue fill buffer occupancy, further comprising:

integrating the measure of the queue fill buffer occupancy over time;
scaling the integral result by an integral coefficient;
differentiating the measure of the queue fill buffer occupancy with respect to time;
scaling the derivative by a derivative coefficient;
scaling the measure of the queue fill buffer occupancy by a proportional coefficient; and
summing the scaled integral, the scaled derivative, and the scaled measure of the queue fill buffer occupancy to obtain a control term.

7. An apparatus for use in controlling congestion in a network, the network including a switch having a queue for receiving packets transmitted over the network from a plurality of source connections, the apparatus comprising:
means for determining a tagging period defining how often packets should be tagged to indicate congestion;
means for determining in response to the tagging period which packets should be tagged, further comprising:
means for selecting a particular connection from which a packet may be tagged, including:
means for updating a measure of time since the connection was last tagged, and
means for updating a statistic based on the updated measure of time,
means for deterministically generating a decision to tag the packet from the selected connection; and
means for tagging the packet currently in the queue according to the packet tagging period.

8. An apparatus for use in controlling congestion in a network, the network including a switch having a queue for receiving packets transmitted over the network from a plurality of source connections, the apparatus comprising:
means for determining a tagging period defining how often packets should be tagged to indicate congestion;
means for determining in response to the tagging period which packets should be tagged, further comprising:
means for selecting a particular connection, having a predetermined weight relative to other connections wherein the predetermined weight is within a range of weights, from which a packet may be tagged, including:
means for generating a random number falling within a range of weights;
means for comparing the generated random number to the connection weight;
means for determining whether to select the connection based on the comparison, and
means for deterministically generating a decision to tag the packet from the selected connection; and
means for tagging the packet currently in the queue according to the packet tagging period.

9. An apparatus for use in controlling congestion in a network, the network including a switch having a queue for receiving packets transmitted over the network from a plurality of source connections, the apparatus comprising:
means for determining a tagging period defining how often packets should be tagged to indicate congestion;
means for maintaining a count of a number of tagging decisions generated;
means for determining in response to the tagging period which packets should be tagged, further comprising:
means for selecting a particular connection from which a packet may be tagged, the connection not currently having packets in the queue, and
means for deterministically generating a decision to tag a next packet from the selected connection; and
means for tagging the next packet to arrive on the selected connection according to the tagging decision;
means for decrementing the count after any packet is tagged;
means for determining when the count exceeds a predetermined limit; and
means for tagging the next packet to arrive on any connection after the count is determined to exceed the limit.

10. An apparatus for use in controlling congestion in a network, the network including a switch having a queue for receiving packets transmitted over the network from a plurality of source connections, the apparatus comprising:
means for determining a single desired queue fill;
means for determining a measure of occupancy of the queue fill buffer based on a current queue fill and the single desired queue fill; and
means for determining a tagging period based on the measure of occupancy of the queue fill buffer, including means for integrating the measure of occupancy of the queue fill buffer over time.

11. An apparatus for use in controlling congestion in a network, the network including a switch having a queue for receiving packets transmitted over the network from a plurality of source connections, the apparatus comprising:
means for determining a single desired queue fill;
means for determining a measure of occupancy of the queue fill buffer based on a current queue fill and the single desired queue fill; and
means for determining a tagging period based on the measure of occupancy of the queue fill buffer, including means for differentiating the measure of occupancy of the queue fill buffer with respect to time.

12. An apparatus for use in controlling congestion in a network, the network including a switch having a queue for receiving packets transmitted over the network from a plurality of source connections, the apparatus comprising:
means for determining a single desired queue fill;
means for determining a measure of occupancy of the queue fill buffer based on a current queue fill and the single desired queue fill; and
means for determining a tagging period based on the measure of occupancy of the queue fill buffer, including:
means for integrating the measure of occupancy of the queue fill buffer over time;
means for scaling the integral result by an integral coefficient;
means for differentiating the measure of occupancy of the queue fill buffer with respect to time;
means for scaling the derivative by a derivative coefficient;
means for scaling the measure of occupancy of the queue fill buffer by a proportional coefficient; and
means for summing the scaled integral, the scaled derivative, and the scaled measure of occupancy of the queue fill buffer to obtain a control term.

13. A communications network comprising:
a plurality of sources transmitting packets to a plurality of destinations; and
a plurality of packet switches, each packet switch comprising:
a queue for receiving the packets transmitted over the network from the sources; and
means for controlling congestion in the network, including:

means for determining a single desired queue fill;

means for determining a measure of occupancy of the queue fill buffer based on a current queue fill and the single desired queue fill; and means for determining a packet tagging period based on the measure of occupancy of the queue fill buffer, including means for integrating the measure of occupancy of the queue fill buffer over time.

14. A method for controlling a communication rate across a network connection between a first endpoint of the connection and a second endpoint of the connection, using a switch with a queue for receiving packets, the method comprising:

transmitting a first packet from the first endpoint of the connection;

receiving the first packet at the switch;

determining whether to tag the first packet as an indication of congestion of the queue;

attaching a first tag to the first packet when the first packet leaves the queue, in response to a determination that the first packet is to be tagged;

transmitting the tagged first packet from the switch;

receiving the tagged first packet at the second endpoint of the connection;

detaching the first tag from the tagged first packet;

attaching a second tag to a second packet as a result of the first packet being tagged;

transmitting the tagged second packet from the second endpoint of the connection;

receiving the tagged second packet at the first endpoint of the connection;

adjusting the rate at which the first endpoint transmits packets through the connection as a result of the second packet being tagged.

15. The method of claim 14 wherein the first tag includes the same information as the second tag.

16. A method for controlling a communication rate across a network connection between a first endpoint of the connection and a second endpoint of the connection, using a switch having a switch fabric and a switch line card, the switch fabric having a queue for receiving packets from the first endpoint of the connection and the switch line card having a queue for receiving packets from the switch fabric, the method comprising:

transmitting a first packet from the first endpoint of the connection;

receiving the first packet at the switch;

determining whether to tag the first packet as an indication of congestion of the switch fabric queue;

attaching a first tag to the first packet as the packet leaves the switch fabric queue, in response to a determination that the first packet is to be tagged;

transmitting the tagged first packet from the switch fabric queue to the switch line card queue;

receiving the first packet at the switch line card queue;

tagging a second packet in the switch line card queue in response to receiving the tagged first packet;

transmitting the tagged second packet from the switch line card queue;

receiving the tagged second packet at the second endpoint of the connection;

detaching a second tag from the tagged second packet;

attaching a third tag to a third packet as a result of the second packet being tagged;

transmitting the tagged third packet from the second endpoint of the connection;

receiving the tagged third packet at the first endpoint of the connection;

adjusting the rate at which the first endpoint transmits packets through the connection as a result of the third packet being tagged.

17. The method of claim 16 wherein the second tag includes the same information as the third tag.

18. The method of claim 16 further comprising detaching the first tag from the first packet.

19. A method for controlling a communication rate across a link in a network connection between a first endpoint of the connection and a second endpoint of the connection, the network including a switch with a queue for receiving packets from the first endpoint of the connection, the method comprising:

transmitting a first packet from the first endpoint of the connection;

attaching a first tag to the first packet as an indication of congestion of the queue;

receiving the tagged first packet at the link;

detaching the first tag from the first packet;

transmitting the first tag across the link;

receiving the first tag at the second endpoint of the connection;

attaching a second tag to a second packet as a result of receiving the first tag;

transmitting the tagged second packet from the second endpoint of the connection;

receiving the tagged second packet at the first endpoint of the connection;

adjusting the rate at which the first endpoint transmits packets through the connection as a result of the second packet being tagged.

20. The method of claim 19 wherein the first tag includes the same information as the second tag.

21. The method of claim 19 wherein said transmitting the first tag across the link includes attaching the first tag to a third packet and transmitting the third packet across the link.

22. The method of claim 19 wherein the link includes a signaling channel and said transmitting the first tag across the link includes transmitting the first tag across the signaling channel.

23. A method for controlling a communication rate across a network connection between a first endpoint of the connection and a second endpoint of the connection, using a switch with a queue for receiving packets, the method comprising:

transmitting a first packet from the first endpoint of the connection;

receiving the first packet at the switch;

determining a tagging period defining how often packets should be tagged to indicate congestion of the queue;

determining whether to tag the first packet in response to the tagging period;

attaching a first tag to the first packet in response to a determination that the first packet is to be tagged;

transmitting the tagged first packet from the switch;

receiving the tagged first packet at the second endpoint of the connection;

detaching the first tag from the tagged first packet;

attaching a second tag to a second packet as a result of the first packet being tagged;

transmitting the tagged second packet from the second endpoint of the connection;

receiving the tagged second packet at the first endpoint of the connection;

adjusting the rate at which the first endpoint transmits packets through the connection as a result of the second packet being tagged.

24. The method of claim 23 wherein the first tag includes the same information as the second tag.

25. The method of claim 23 wherein said attaching a first tag includes tagging a packet currently in the queue according to the tagging period.

26. The method of claim 23, further comprising generating a request for tagging a packet that will arrive at the queue at a future time according to the tagging period.

27. The method of claim 23, wherein said determining whether to tag the first packet includes deterministically generating the tagging determination based on the tagging period.

28. The method of claim 27, wherein said deterministically generating a tagging determination is performed by a controller shared among a plurality of queues.

29. The method of claim 23, wherein said determining whether to tag the first packet comprises:

selecting a particular connection from which the first packet may be tagged; and deterministically generating the tagging determination for the first packet from the selected connection.

30. The method of claim 29, wherein said selecting the particular connection comprises:

updating a metric corresponding to the particular connection;

updating a statistic based on the updated connection metric; and determining whether the updated statistic meets predetermined statistical criteria.

31. The method of claim 30, wherein the particular connection has a predetermined weight relative to other connections, and wherein said selecting the particular connection further comprises modifying the metric according to the predetermined weight of the particular connection.

32. The method of claim 29, wherein said selecting a particular connection comprises:

updating a count of a number of packets passed on the particular connection since a last tagged packet for the particular connection;

updating a statistic based on the updated count via an exponentially weighted moving-average filter with peak follower; and determining whether the updated statistic meets predetermined statistical criteria.

33. The method of claim 23, wherein said determining whether to tag the first packet comprises:

selecting a particular connection from which the first packet may be tagged, the selected connection having packets in the queue; and deterministically generating the tagging determination for the first packet from the selected connection.

34. The method of claim 23, wherein said determining whether to tag the first packet comprises:

selecting a particular connection from which the first packet may be tagged, the selected connection not currently having packets in the queue; and deterministically generating the tagging determination for the first packet from the selected connection.

35. The method of claim 23, wherein said determining whether to tag the first packet comprises:

selecting a particular connection from which the first packet may be tagged based on time since a last tagged packet for the particular connection; and deterministically generating the tagging determination for the first packet from the selected connection.

36. The method of claim 23, wherein said determining whether to tag the first packet comprises:

selecting a particular connection from which the first packet may be tagged based on bandwidth at which the particular connection is transmitting packets to the network; and deterministically generating the tagging determination for the first packet from the selected connection.

37. The method of claim 23, wherein said determining whether to tag the first packet comprises:

updating a connection metric;

updating a connection statistic based on the updated connection metric; and determining whether the connection statistic meets predetermined statistical criteria.

38. A method for controlling a communication rate across a network connection between a first endpoint of the connection and a second endpoint of the connection, using a switch with a queue for receiving packets, the method comprising:

transmitting a first packet from the first endpoint of the connection;

receiving the first packet at the switch;

determining a single desired queue fill;

determining a measure of occupancy of the queue fill buffer based on a current queue fill and the single desired queue fill;

determining a tagging period based on the measure of occupancy of the queue fill buffer;

determining whether to tag the first packet based on the tagging period;

attaching a first tag to the first packet in response to a determination that the first packet is to be tagged;

transmitting the tagged first packet from the switch;

receiving the tagged first packet at the second endpoint of the connection;

detaching the first tag from the tagged first packet;

attaching a second tag to a second packet as a result of the first packet being tagged;

transmitting the tagged second packet from the second endpoint of the connection;

receiving the tagged second packet at the first endpoint of the connection;

adjusting the rate at which the first endpoint transmits packets through the connection as a result of the second packet being tagged.

39. A method for controlling a communication rate across a network connection between a first endpoint of the connection and a second endpoint of the connection, using a switch with a queue for receiving cells transmitted over the network from a plurality of source connections, the method comprising:

transmitting a first packet from the first endpoint of the connection;

receiving the first packet at the switch;

determining a tagging period based on a function that linearizes response of the source connections to the first packet being tagged;

determining whether to tag the first packet based on the tagging period;

attaching a first tag to the first packet in response to a determination that the first packet is to be tagged;

transmitting the tagged first packet from the switch;

receiving the tagged first packet at the second endpoint of the connection;

detaching the first tag from the tagged first packet;

attaching a second tag to a second packet as a result of the first packet being tagged;

transmitting the tagged second packet from the second endpoint of the connection;

receiving the tagged second packet at the first endpoint of the connection;

adjusting the rate at which the first endpoint transmits packets through the connection as a result of the second packet being tagged.

40. The method of claim 39, further comprising determining a measure of occupancy of the queue fill buffer, wherein said determining a tagging period includes searching a look-up table indexed on the measure of queue fill buffer occupancy to obtain the tagging period.

41. A method for controlling a communication rate across a network connection between a first endpoint of the connection and a second endpoint of the connection, using a switch having a queue for receiving packets, the method comprising:

transmitting a first packet from the first endpoint of the connection;

receiving the first packet at the switch;

determining whether to discard the first packet in response to congestion of the queue;

discarding the first packet in response to a determination that the first packet is to be discarded;

determining whether or not the first packet was received at the second endpoint of the connection;

tagging a second packet, in response to a determination that the first packet was not received;

transmitting the tagged second packet from the second endpoint of the connection;

receiving the tagged second packet at the first endpoint of the connection;

adjusting the rate at which the first endpoint transmits packets through the connection as a result of the tagged second packet being tagged.

42. A method for controlling a communication rate across a network connection between a first endpoint of the connection and a second endpoint of the connection, using a switch having a queue for receiving packets, the method comprising:

transmitting a first packet from the first endpoint of the connection;

receiving the first packet at the switch;

determining whether to discard the first packet in response to congestion of the queue;

discarding the first packet in response to a determination that the first packet is to be discarded;

transmitting an idle packet, in place of the discarded first packet, from the switch;

receiving the idle packet at the first endpoint of the connection;

tagging a second packet, in response to receiving the idle packet;

transmitting the tagged second packet from the second endpoint of the connection;

receiving the tagged second packet at the first endpoint of the connection;

adjusting the rate at which the first endpoint transmits packets through the connection as a result of the tagged second packet being tagged.

43. An apparatus for controlling a communication rate across a network connection between a first endpoint of the connection and a second endpoint of the connection, using a switch with a queue for receiving packets, the apparatus comprising:

means for transmitting a first packet from. the first endpoint of the connection;

means for receiving the first packet at the switch;

means for determining whether to tag the first packet as an indication of congestion of the queue;

means for attaching a first tag to the first packet when the first packet leaves the queue, in response to a determination that the first packet is to be tagged;

means for transmitting the tagged first packet from the switch;

means for receiving the tagged first packet at the second endpoint of the connection;

means for detaching the first tag from the tagged first packet;

means for attaching a second tag to a second packet as a result of the first packet being tagged and after receiving the tagged first packet;

means for transmitting the tagged second packet from the second endpoint of the connection;

means for receiving the tagged second packet at the first endpoint of the connection;

means for adjusting the rate at which the first endpoint transmits packets through the connection as a result of the second packet being tagged.

44. The apparatus of claim 43 wherein the first tag includes the same information as the second tag.

45. An apparatus for controlling a communication rate across a network connection between a first endpoint of the connection and a second endpoint of the connection, using a switch having a switch fabric and a switch line card, the switch fabric having a queue for receiving packets from the first endpoint of the connection and the switch line card having a queue for receiving packets from the switch fabric, the apparatus comprising:

means for transmitting a first packet from the first endpoint of the connection;

means for receiving the first packet at the switch;

means for determining whether to tag the first packet as an indication of congestion of the switch fabric queue;

means for attaching a first tag to the first packet as the packet leaves the switch fabric queue, in response to a determination that the first packet is to be tagged;

means for transmitting the tagged first packet from the switch fabric queue to the switch line card queue;

means for receiving the first packet at the switch line card queue;

means for tagging a second packet in the switch line card queue in response to receiving the tagged first packet;

means for transmitting the tagged second packet from the switch line card queue;

means for receiving the tagged second packet at the second endpoint of the connection;

means for detaching a second tag from the tagged second packet;

means for attaching a third tag to a third packet as a result of the second packet being tagged;

means for transmitting the tagged third packet from the second endpoint of the connection;

means for receiving the tagged third packet at the first endpoint of the connection;

means for adjusting the rate at which the first endpoint transmits packets through the connection as a result of the third packet being tagged.

46. The apparatus of claim 45 wherein the second tag includes the same information as the third tag.

47. The apparatus of claim 45 further comprising means for detaching the first tag from the first packet.

48. An apparatus for controlling a communication rate across a link in a network connection between a first endpoint of the connection and a second endpoint of the connection, the network including a switch with a queue for receiving packets from the first endpoint of the connection, the apparatus comprising:

means for transmitting a first packet from the first endpoint of the connection;

means for attaching a first tag to the first packet as an indication of congestion of the queue;

means for receiving the tagged first packet at the link;

means for detaching the first tag from the first packet;

means for transmitting the first tag across the link;

means for receiving the first tag at the second endpoint of the connection;

means for attaching a second tag to a second packet as a result of receiving the first tag;

means for transmitting the tagged second packet from the second endpoint of the connection;

means for receiving the tagged second packet at the first endpoint of the connection;

means for adjusting the rate at which the first endpoint transmits packets through the connection as a result of the second packet being tagged.

49. The apparatus of claim 48 wherein the first tag includes the same information as the second tag.

50. The apparatus of claim 48 wherein said means for transmitting the first tag across the link includes means for attaching the first tag to a third packet and means for transmitting the third packet across the link.

51. The apparatus of claim 48 wherein the link includes a signaling channel and said means for transmitting the first tag across the link includes means for transmitting the first tag across the signaling channel.

52. An apparatus for controlling a communication rate across a network connection between a first endpoint of the connection and a second endpoint of the connection, using a switch with a queue for receiving packets, the apparatus comprising:

means for transmitting a first packet from the first endpoint of the connection;

means for receiving the first packet at the switch;

means for determining a tagging period defining how often packets should be tagged to indicate congestion of the queue;

means for determining whether to tag the first packet in response to the tagging period;

means for attaching a first tag to the first packet in response to a determination that the first packet is to be tagged;

means for transmitting the tagged first packet from the switch;

means for receiving the tagged first packet at the second endpoint of the connection;

means for detaching the first tag from the tagged first packet;

means for attaching a second tag to a second packet as a result of the first packet being tagged and after receiving the tagged first packet;

means for transmitting the tagged second packet from the second endpoint of the connection;

means for receiving the tagged second packet at the first endpoint of the connection;

means for adjusting the rate at which the first endpoint transmits packets through the connection as a result of the second packet being tagged.

53. The apparatus of claim 52 wherein the first tag includes the same information as the second tag.

54. The apparatus of claim 52 wherein said means for attaching a first tag includes means for tagging a packet currently in the queue according to the tagging period.

55. The apparatus of claim 52, further comprising means for generating a request for tagging a packet that will arrive at the queue at a future time according to the tagging period.

56. The apparatus of claim 52, wherein said means for determining whether to tag the first packet includes means for deterministically generating the tagging determination based on the tagging period.

57. The apparatus of claim 56, wherein said means for deterministically generating a tagging determination is performed by a controller shared among a plurality of queues.

58. The apparatus of claim 52, wherein said means for determining whether to tag the first packet comprises:

means for selecting a particular connection from which the first packet may be tagged; and means for deterministically generating the tagging determination for the first packet from the selected connection.

59. The apparatus of claim 58, wherein said means for selecting the particular connection comprises:

means for updating a metric corresponding to the particular connection;

means for updating a statistic based on the updated connection metric; and means for determining whether the updated statistic meets predetermined statistical criteria.

60. The apparatus of claim 59, wherein the particular connection has a predetermined weight relative to other connections, and wherein said means for selecting the particular connection further comprises means for modifying the metric according to the predetermined weight of the particular connection.

61. The apparatus of claim 58, wherein said means for selecting a particular connection comprises:

means for updating a count of a number of packets passed on the particular connection since a last tagged packet for the particular connection;

means for updating a statistic based on the updated count via an exponentially weighted moving-average filter with peak follower; and means for determining whether the updated statistic meets predetermined statistical criteria.

62. The apparatus of claim 52, wherein said means for determining whether to tag the first packet comprises:

means for selecting a particular connection from which the first packet may be tagged, the selected connection having packets in the queue; and means for deterministically generating the tagging determination for the first packet from the selected connection.

63. The apparatus of claim 52, wherein said means for determining whether to tag the first packet comprises:
  means for selecting a particular connection from which the first packet may be tagged, the selected connection not currently having packets in the queue; and
  means for deterministically generating the tagging determination for the first packet from the selected connection.

64. The apparatus of claim 52, wherein said means for determining whether to tag the first packet comprises:
  means for selecting a particular connection from which the first packet may be tagged based on time since a last tagged packet for the particular connection; and
  means for deterministically generating the tagging determination for the first packet from the selected connection.

65. The apparatus of claim 52, wherein said means for determining whether to tag the first packet comprises:
  means for selecting a particular connection from which the first packet may be tagged based on bandwidth at which the particular connection is transmitting packets to the network; and
  means for deterministically generating the tagging determination for the first packet from the selected connection.

66. The apparatus of claim 52, wherein said means for determining whether to tag the first packet comprises:
  means for updating a connection metric;
  means for updating a connection statistic based on the updated connection metric; and
  means for determining whether the connection statistic meets predetermined statistical criteria.

67. An apparatus for controlling a communication rate across a network connection between a first endpoint of the connection and a second endpoint of the connection, using a switch with a queue for receiving packets, the apparatus comprising:
  means for transmitting a first packet from the first endpoint of the connection;
  means for receiving the first packet at the switch;
  means for determining a single desired queue fill;
  means for determining a measure of occupancy of the queue fill buffer based on a current queue fill and the single desired queue fill;
  means for determining a tagging period based on the measure of occupancy of the queue fill buffer;
  means for determining whether to tag the first packet based on the tagging period;
  means for attaching a first tag to the first packet in response to a determination that the first packet is to be tagged;
  means for transmitting the tagged first packet from the switch;
  means for receiving the tagged first packet at the second endpoint of the connection;
  means for detaching the first tag from the tagged first packet;
  means for attaching a second tag to a second packet as a result of the first packet being tagged and after receiving the tagged first packet;
  means for transmitting the tagged second packet from the second endpoint of the connection;
  means for receiving the tagged second packet at the first endpoint of the connection;
  means for adjusting the rate at which the first endpoint transmits packets through the connection as a result of the second packet being tagged.

68. An apparatus for controlling a communication rate across a network connection between a first endpoint of the connection and a second endpoint of the connection, using a switch with a queue for receiving cells transmitted over the network from a plurality of source connections, the apparatus comprising:
  means for transmitting a first packet from the first endpoint of the connection;
  means for receiving the first packet at the switch;
  means for determining a tagging period based on a function that linearizes response of the source connections to the first packet being tagged;
  means for determining whether to tag the first packet based on the tagging period;
  means for attaching a first tag to the first packet in response to a determination that the first packet is to be tagged;
  means for transmitting the tagged first packet from the switch;
  means for receiving the tagged first packet at the second endpoint of the connection;
  means for detaching the first tag from the tagged first packet;
  means for attaching a second tag to a second packet as a result of the first packet being tagged and after receiving the tagged first packet;
  means for transmitting the tagged second packet from the second endpoint of the connection;
  means for receiving the tagged second packet at the first endpoint of the connection;
  means for adjusting the rate at which the first endpoint transmits packets through the connection as a result of the second packet being tagged.

69. The apparatus of claim 68, further comprising means for determining a measure of occupancy of the queue fill buffer, wherein said means for determining a tagging period includes means for searching a look-up table indexed on the measure of queue fill buffer occupancy to obtain the tagging period.

70. An apparatus for controlling a communication rate across a network connection between a first endpoint of the connection and a second endpoint of the connection, using a switch having a queue for receiving packets, the apparatus comprising:
  means for transmitting a first packet from the first endpoint of the connection;
  means for receiving the first packet at the switch;
  means for determining whether to discard the first packet in response to congestion of the queue;
  means for discarding the first packet in response to a determination that the first packet is to be discarded;
  means for determining whether or not the first packet was received at the second endpoint of the connection;
  means for tagging a second packet, in response to a determination that the first packet was not received;
  means for transmitting the tagged second packet from the second endpoint of the connection;

means for receiving the tagged second packet at the first endpoint of the connection;

means for adjusting the rate at which the first endpoint transmits packets through the connection as a result of the tagged second packet being tagged.

71. An apparatus for controlling a communication rate across a network connection between a first endpoint of the connection and a second endpoint of the connection, using a switch having a queue for receiving packets, the apparatus comprising:

means for transmitting a first packet from the first endpoint of the connection;

means for receiving the first packet at the switch;

means for determining whether to discard the first packet in response to congestion of the queue;

means for discarding the first packet in response to a determination that the first packet is to be discarded;

means for transmitting an idle packet, in place of the discarded first packet, from the switch;

means for receiving the idle packet at the first endpoint of the connection;

means for tagging a second packet, in response to receiving the idle packet;

means for transmitting the tagged second packet from the second endpoint of the connection;

means for receiving the tagged second packet at the first endpoint of the connection;

means for adjusting the rate at which the first endpoint transmits packets through the connection as a result of the tagged second packet being tagged.

72. A communications network, comprising:

means for providing at least one connection between a first endpoint and a second endpoint;

means for transmitting a first packet from the first endpoint of the connection;

means for controlling a communication rate of the connection using at least one packet switch with a queue for receiving packets, said packet switch comprising:

means for receiving the first packet at the switch, means for determining whether to tag the first packet as an indication of congestion of the queue, and means for attaching a first tag to the first packet when the first packet leaves the queue, in response to a determination that the first packet is to be tagged;

means for transmitting the tagged first packet from the switch;

means for receiving the tagged first packet at the second endpoint of the connection;

means for detaching the first tag from the tagged first packet;

means for attaching a second tag to a second packet as a result of the first packet being tagged and after receiving the tagged first packet;

means for transmitting the tagged second packet from the second endpoint of the connection;

means for receiving the tagged second packet at the first endpoint of the connection;

means for adjusting the rate at which the first endpoint transmits packets through the connection as a result of the second packet being tagged.

73. A communications network, comprising:

means for providing at least one connection between a first endpoint and a second endpoint;

means for transmitting a first packet from the first endpoint of the connection;

means for controlling a communication rate of the connection using at least one packet switch with a queue for receiving packets, said packet switch comprising:

means for receiving the first packet at the switch, means for determining a tagging period defining how often packets should be tagged to indicate congestion;

means for determining whether to tag the first packet according to the tagging period, means for generating a request for tagging a packet that will arrive at the queue based on the tagging period, and means for attaching a first tag to the first packet in response to a determination that the first packet is to be tagged;

means for transmitting the tagged first packet from the switch;

means for receiving the tagged first packet at the second endpoint of the connection;

means for detaching the first tag from the tagged first packet;

means for attaching a second tag to a second packet as a result of the first packet being tagged and after receiving the tagged first packet;

means for transmitting the tagged second packet from the second endpoint of the connection;

means for receiving the tagged second packet at the first endpoint of the connection;

means for adjusting the rate at which the first endpoint transmits packets through the connection as a result of the second packet being tagged.

74. The communications network of claim 73, wherein said means for determining whether to tag the first packet according to the tagging period includes means for deterministically generating the tagging determination based on the tagging period.

75. The communications network of claim 73, wherein said means for determining whether to tag the first packet according to the tagging period includes:

means for selecting a particular connection from which the first packet may be tagged; and means for deterministically generating the tagging determination for the first packet from the selected connection.

76. The communications network of claim 75, wherein said means for selecting the particular connection comprises:

means for updating a metric corresponding to the particular connection;

means for updating a statistic based on the updated connection metric; and means for determining whether the updated statistic meets predetermined statistical criteria.

77. A communications network, comprising:

means for providing at least one connection between a first endpoint and a second endpoint;

means for transmitting a first packet from the first endpoint of the connection;

means for controlling a communication rate of the connection using at least one packet switch with a queue for receiving packets, said packet switch comprising:

means for receiving the first packet at the switch, means for determining a single desired queue fill;

means for determining a measure of occupancy of the queue fill buffer based on a current queue fill and the single desired queue fill;

means for determining a tagging period based on the measure of occupancy of the queue fill buffer;

means for determining whether to tag the first packet based on the tagging period, and means for attaching a first tag to the first packet in response to a determination that the first packet is to be tagged;

means for transmitting the tagged first packet from the switch;

means for receiving the tagged first packet at the second endpoint of the connection;

means for detaching the first tag from the tagged first packet;

means for attaching a second tag to a second packet as a result of the first packet being tagged and after receiving the tagged first packet;

means for transmitting the tagged second packet from the second endpoint of the connection;

means for receiving the tagged second packet at the first endpoint of the connection;

means for adjusting the rate at which the first endpoint transmits packets through the connection as a result of the second packet being tagged.

78. The communications network of claim 77, wherein said means for determining a tagging period includes means for integrating the measure of occupancy of the queue fill buffer over time.

79. A communications network, comprising:

means for providing at least one connection between a first endpoint and a second endpoint;

means for transmitting a first packet from the first endpoint of the connection;

means for controlling a communication rate of the connection using at least one packet switch with a queue for receiving packets, said packet switch comprising:
means for receiving the first packet at the switch,
means for determining whether to discard the first packet in response to congestion of the queue, and means for discarding the first packet in response to a determination that the first packet is to be discarded;

means for determining whether or not the first packet was received at the second endpoint of the connection;

means for tagging a second packet, in response to a determination that the first packet was not received;

means for transmitting the tagged second packet from the second endpoint of the connection;

means for receiving the tagged second packet at the first endpoint of the connection; and means for adjusting the rate at which the first endpoint transmits packets through the connection as a result of the second packet being tagged.

80. A communications network, comprising:

means for providing at least one connection between a first endpoint and a second endpoint;

means for transmitting a first packet from the first endpoint of the connection;

means for controlling a communication rate of the connection using at least one packet switch with a queue for receiving packets, said packet switch comprising:
means for receiving the first packet at the switch,
means for determining whether to discard the first packet in response to congestion of the queue,
means for discarding the first packet in response to a determination that the first packet is to be discarded, and
means for transmitting an idle packet, in place of the discarded first packet, from the switch;

means for receiving the idle packet at the second endpoint of the connection;

means for tagging a second packet, in response to receiving the idle packet;

means for transmitting the tagged second packet from the second endpoint of the connection;

means for receiving the tagged second packet at the first endpoint of the connection;

means for adjusting the rate at which the first endpoint transmits packets through the connection as a result of the second packet being tagged.

* * * * *